United States Patent
Wakai

(10) Patent No.: US 8,145,997 B2
(45) Date of Patent: Mar. 27, 2012

(54) METHOD FOR SIMULTANEOUSLY PERFORMING A PLURALITY OF HANDWRITTEN SEARCHES

(75) Inventor: Masanori Wakai, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 1449 days.

(21) Appl. No.: 11/472,675

(22) Filed: Jun. 22, 2006

(65) Prior Publication Data
US 2007/0003143 A1    Jan. 4, 2007

(30) Foreign Application Priority Data
Jun. 30, 2005   (JP) ................. 2005-192197

(51) Int. Cl.
G06K 9/00       (2006.01)
G06F 17/27      (2006.01)
G06F 17/28      (2006.01)
G06F 3/033      (2006.01)

(52) U.S. Cl. ............ 715/268; 715/863; 382/282
(58) Field of Classification Search ........... 715/268, 715/863; 382/181
See application file for complete search history.

(56) References Cited

U.S. PATENT DOCUMENTS

| | | | |
|---|---|---|---|
| 5,583,543 A * | 12/1996 | Takahashi et al. | 345/173 |
| 6,342,901 B1 * | 1/2002 | Adler et al. | 715/700 |
| 7,111,230 B2 * | 9/2006 | Euchner et al. | 715/232 |
| 7,246,321 B2 * | 7/2007 | Bryborn et al. | 715/741 |
| 7,487,461 B2 * | 2/2009 | Zhai et al. | 715/773 |
| 7,546,525 B2 * | 6/2009 | Bargeron | 715/230 |
| 7,895,518 B2 * | 2/2011 | Kristensson | 715/263 |
| 2004/0085301 A1 | 5/2004 | Furukawa | |
| 2005/0190973 A1 * | 9/2005 | Kristensson et al. | 382/229 |
| 2005/0275638 A1 * | 12/2005 | Kolmykov-Zotov et al. | 345/179 |
| 2006/0253793 A1 * | 11/2006 | Zhai et al. | 715/773 |

FOREIGN PATENT DOCUMENTS

| | | |
|---|---|---|
| CN | 1493961 A | 5/2004 |
| JP | 3388451 B | 1/2003 |
| JP | 2005-108032 A | 4/2005 |

* cited by examiner

*Primary Examiner* — Doug Hutton, Jr.
*Assistant Examiner* — Soumya Dasgupta
(74) *Attorney, Agent, or Firm* — Canon USA Inc IP Division

(57) ABSTRACT

In a personal computer, a personal digital assistant or any other information processing device that includes a display screen and a digitizer tablet, thereby accepting handwritten input from a user, a method for simultaneously performing multiple handwritten searches. From handwritten input provided by the user, the method automatically determines that multiple search commands have been given by the user, detects multiple search items specified by the user and simultaneously performs the searches. For each of the multiple search items, the method may assign a weight to each of the multiple search commands based upon the size and position of the corresponding search command. The method also permits the user to delete one or more of the search commands from the simultaneous performance of the multiple searches.

12 Claims, 52 Drawing Sheets

| STROKE | COMMAND | DISPLAY DESTINATION SPECIFICATION | |
|---|---|---|---|
| ⤫ | DELETE | NO | ～61 |
| ⌕ | SEARCH | YES | ～62 |
| ✓ | COPY | NO | ～63 |

SEARCH KEY IDENTIFICATION RULE

| ITEM | DETAIL | |
|---|---|---|
| PRIORITY | (1) IN HANDWRITING SEARCH COMMAND DRAWING AREA<br>(2) UPPER LEFT VICINITY<br>(3) VICINITY | 91 |
| VICINITY RATIO | 3 FOLD OF HANDWRITING SEARCH COMMAND DRAWING AREA | 92 |
| WEIGHT RATIO | 1 FOLD OF HANDWRITING SEARCH COMMAND DRAWING AREA RATIO | 93 |

OBJECT LIST

| OBJECT | X1 | Y1 | X2 | Y2 | |
|---|---|---|---|---|---|
| THEME DISCUSSION | 20 | 50 | 450 | 100 | ~131 |
| PLAN | 50 | 150 | 200 | 230 | ~132 |
| ● | 300 | 310 | 380 | 380 | ~133 |

SEARCH COMMAND LIST

| ID | DRAWING AREA SIZE | SIZE RATIO | |
|---|---|---|---|
| 201 | 20×20=400 | 4 | —211 |
| 202 | 50×40=2000 | 20 | —212 |
| 203 | 10×10=100 | 1 | —213 |

SEARCH KEY LIST

| ID | SEARCH KEY | WEIGHT | |
|---|---|---|---|
| 204 | PLAN | 4 | ─231 |
| 205 | FIRST SECTION | 20 | ─232 |
| 206 |  | 1 | ─233 |

SEARCH COMMAND LIST

| ID | COMMAND SIZE | ID | KEY SIZE | COMMAND/KEY | RATE OF RATIO | |
|---|---|---|---|---|---|---|
| 201 | 20×20=400 | 204 | 50×100=5000 | 0.08 | 1.7 | ─241 |
| 202 | 50×40=2000 | 205 | 30×100=3000 | 0.67 | 11.2 | ─242 |
| 203 | 10×10=100 | 206 | 40×40=1600 | 0.06 | 1 | ─243 |

SEARCH KEY LIST

FIG. 45
| STROKE | COMMAND | DISPLAY DESTINATION SPECIFICATION | |
|---|---|---|---|
|  | DELETE | NO | —451 |
|  | SEARCH | YES | —452 |
|  | COPY | NO | —453 |
|  | UPPER LEFT POINT | NO | —454 |
|  | LOWER LEFT POINT | NO | —455 |

POINT IDENTIFICATION RULE

| ITEM | DETAIL | |
|---|---|---|
| PRIORITY | 1. IN HANDWRITING COMMAND DRAWING AREA<br>2. ARROW DIRECTION VICINITY | 471 |
| VICINITY RATIO | 3 FOLD OF HANDWRITING SEARCH COMMAND DRAWING AREA | 472 |
| WEIGHT RATIO | 1 FOLD OF HANDWRITING SEARCH COMMAND DRAWING AREA RATIO | 473 |

HANDWRITING ATTRIBUTE DATA

| ID | ATTRIBUTE ASSIGNMENT TARGET | ATTRIBUTE (WEIGHTING) | |
|---|---|---|---|
| 303 | EMERGENCY PLAN DRAFT | A (2), B (10) | 5201 |
| 304 | FIRST DEVELOPMENT | B (7) | 5202 |
| 305 |  | A (9) | 5203 |

FIG. 55
HANDWRITING ATTRIBUTE ASSIGNMENT
COMMAND DEFINITION DATA LIST
| STROKE | ATTRIBUTE | |
|--------|-----------|---|
|  | A | ⎯5501 |
|  | B | ⎯5502 |
|  | C | ⎯5503 |
| ⋮ | ⋮ | ⎯5504 |

METHOD FOR SIMULTANEOUSLY PERFORMING A PLURALITY OF HANDWRITTEN SEARCHES

BACKGROUND OF THE INVENTION

1. Field of the Invention

The present invention relates to an information processing device for processing data that is input by a handwriting input unit, a method related to the same, and a program.

2. Description of the Related Art

Up to now, an information processing device including a handwriting input unit, such as a PC, a PDA, or a large screen display provided with a digitizer, employs a GUI having a familiar pen-style handwriting input unit other than GUI operations by using a key board and a mouse. To be specific, an instruction operation for command execution is realized by handwriting input, whereby improvement in the operability is achieved while taking advantage of the handwriting input unit.

For example, according to Japanese Patent No. 03388451, in an information processing device, displayed data is circled by using a pen and an edit command is input. When the edit command has been registered, the corresponding command is executed, and when the edit command has not been registered, this command is newly registered.

However, according to Japanese Patent No. 03388451, a range specification for the command target needs to be performed, so the operability is degraded. Furthermore, a method of executing a plurality of commands in combination is not considered in the above-mentioned patent. In addition, the case of incorrect recognition of commands and the case of non-recognition of commands are not considered. Besides, a method of specifying a display destination of the command execution result is not considered.

SUMMARY OF THE INVENTION

The present invention has been made in view of the above-mentioned problems. In the present invention, the command target can be identified and executed without command target range specification. Also, the command target can be executed by using plural commands in combination. Also, operations can be appropriately conducted even in the case of incorrect recognition of commands and the case of non-recognition of commands. Also, a display destination of a command execution result can be specified. In addition, an attribute assignment target can be identified and executed without attribute assignment target range specification. Furthermore, weighting can be performed on the assigned attributes. Moreover, a process in which an attribute assignment target in a scan original is specified can be instructed.

According to an exemplary embodiment of the present invention, an information processing device is provided which includes a handwriting command interpretation unit configured to interpret handwriting data input by handwriting input unit as a handwriting command; and a target identification unit configured to identify at least part of data corresponding to an input position of the command interpreted by the handwriting command interpretation unit, as a process target of the handwriting command.

According to an aspect of the present invention, the target identification unit identifies a search key from the data. According to another aspect of the present invention, the target identification unit identifies a process target from an area obtained on the basis of a size and a position of the handwriting command.

According to another aspect of the present invention, the information processing device may further include a clarification unit configured to clarify a process target by changing a display mode of the data corresponding to the process target. And according to another aspect of the present invention, the information processing device may further include a change unit configured to change a range of the process target.

According to another aspect of the present invention the target identification unit may include a handwriting character recognition unit configured to recognize stroke data that is displayed on a display device, as a character string, wherein the character string recognized by the handwriting character recognition unit is identified as the process target. Moreover, according to another aspect of the present invention, when the plural handwriting commands are input, the target identification unit identifies a plurality of process targets from data corresponding to the respective input positions and the process is executed by using the plurality of process targets in combination.

According to still yet another aspect of the present invention, the target identification unit weights the process targets corresponding to the commands on the basis of sizes of the plural handwriting commands. Additionally, according to yet another aspect of the present invention, the information processing device may further include a delete unit configured to delete the handwriting command; and a process termination unit configured to terminate the process when the handwriting command is deleted.

According to yet another aspect of the present invention, the information processing device may further include a delete unit configured to delete the handwriting command; and a process target exclusion unit configured to exclude the corresponding process target when the handwriting command is deleted. Furthermore, according to another aspect of the present invention the handwriting command interpretation unit may include a handwriting command discrimination unit configured to discriminate the input handwriting command as a different type of command from another handwriting command, wherein the process is executed by using the process targets in combination for each type of the handwriting commands.

Moreover, according to yet another aspect of the present invention, the handwriting command discrimination unit discriminates one of a color and a size of the input data to discriminate the type in accordance with the discrimination result. And, according to another aspect of the present invention, the handwriting command discrimination unit may include an attendant input data interpretation unit for interpreting input data attended with the handwriting command, wherein the type of the handwriting command is discriminated by the attendant input data.

According to still another aspect of the present invention, the information processing device may further include a process target identification rule specification unit for specifying a rule employed to identify the process target. Also, according to another aspect of the present invention, the information processing device may further include a handwriting character recognition unit configured to recognize the handwriting data corresponding to the handwriting command as a character string when the process target cannot be identified by the handwriting command process target identification unit.

According to yet another aspect of the present invention, the information processing device may further include a recognition candidate display unit configured to display a recognition candidate of the handwriting command. Further, according to another aspect of the present invention, displaying the recognition candidate is terminated when a character is selected by the recognition candidate display unit. And still further, according to yet another aspect of the present invention, the information processing device may further include a process target exclusion unit configured to exclude the corresponding process target from the combination when a character is selected by the recognition candidate display unit.

Moreover, according to another aspect of the present invention, the target identification unit expands an identification range until the process target is identified. Still yet, in another aspect of the present invention, the information processing device may further include a handwriting display destination specification command interpretation unit configured to interpret the handwriting data following the handwriting command as a display destination specification command, wherein the handwriting command process result is displayed on the display destination.

Furthermore, according to another aspect of the present invention the command interpretation unit interprets the input by the input unit as a handwriting point instruction command, and the target identification unit identifies a point from the data and includes minutes production unit for producing minutes by using the point. Moreover, according to yet another aspect of the present invention, the target identification unit identifies an attribute assignment target from the data.

And, according to another aspect of the present invention, the target identification unit weights the attribute assignment targets on the basis of the data size and includes weighting sort unit for sorting the attribute assignment targets on the basis of the weighting. Also, according to another aspect of the present invention, the information processing device may further include a scan unit configured to scan an original on which handwriting data is written; and a process instruction unit configured to instruct a process on the attribute assignment targets identified by the target identification unit.

Moreover, according to yet another aspect of the present invention, the process instruction unit instructs sorting by using one of the attribute and the weighting and includes attribute sort unit for sorting the attribute assignment targets on the basis of the attributes. And, according to still another aspect of the present invention, the information processing device may further include an attribute narrow down unit configured to narrow down the attribute assignment targets on the basis of the attribute, wherein the process instruction unit issues an instruction to the target narrowed down on the basis of the attribute.

According to another exemplary embodiment of the present invention, an information processing control method is provided for an information processing device for processing data that is input by a handwriting input unit, the method including interpreting handwriting data input by the handwriting input unit as a handwriting command; and identifying at least part of data corresponding to an input position of the command interpreted as a process target of the handwriting command.

And further, according to yet another exemplary embodiment of the present invention, a computer readable medium is provided which contains computer-executable instructions for an information processing device for processing data that is input by a handwriting input unit, the medium including computer-executable instructions for interpreting handwriting data input by the handwriting input unit as a handwriting command; and computer-executable instructions for identifying at least part of data corresponding to an input position of the command interpreted as a process target of the handwriting command.

According to the present invention discussed above, the command target can be identified and executed without command target range specification, whereby the operability is improved.

Other embodiments, features and aspects of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 45 shows an example handwriting command database including a handwriting point instruction command.

FIG. 55 shows exemplary handwriting attribute assignment command definition data.

DESCRIPTION OF THE EMBODIMENTS

Numerous embodiments, features and aspects of the present invention will now be described in detail in accordance with the accompanying drawings. It is noted that the following embodiments are not intended to limit the invention described in the scope of the claims.

First Exemplary Embodiment

Figure 1:
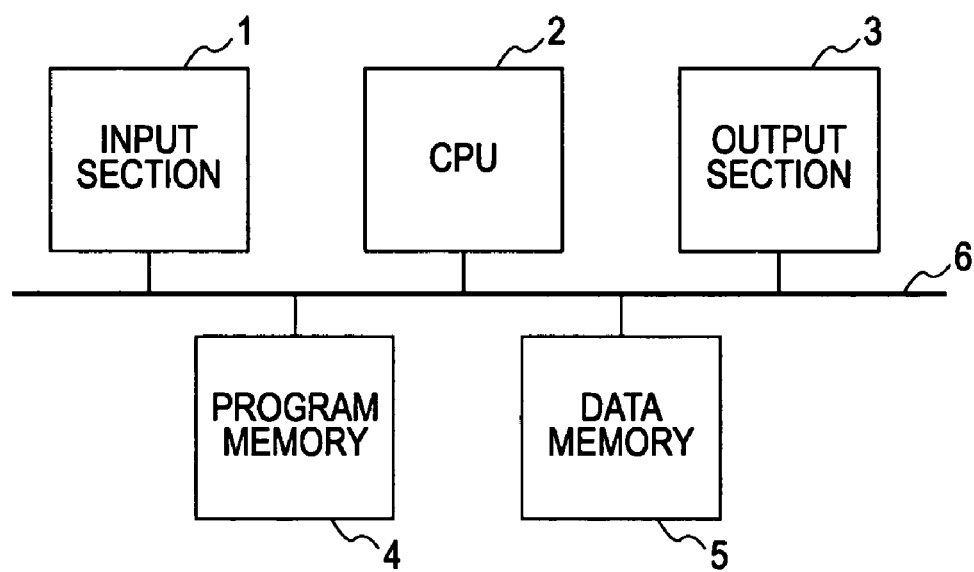
FIG. 1 is a block diagram showing an exemplary hardware configuration of an information processing device according to an embodiment of the present invention.

FIG. 1 is a block diagram showing an exemplary hardware configuration of an information processing device according to an embodiment of the present invention. Reference numeral 1 denotes an input section for inputting data. Reference numeral 2 denotes a CPU (or processor) for performing calculation for various processes, logical judgment, and the like to control respective components connected to a bus 6. Reference numeral 3 denotes an output section for outputting data. Examples of the output section 3 include a display such as an LCD or CRT and a recording device such as a printer. Reference numeral 4 denotes a program memory, in which a program including steps in a flowchart described later for the control by a CPU 2 is stored. The program memory 4 may be a ROM or a RAM (or memory) to which a program is loaded from an external memory device or the like. Reference numeral 5 denotes a data memory for storing data generated in various processes. The data memory 5 is, for example, a RAM. Loading from a nonvolatile external storage medium is performed before the process is executed or the nonvolatile external storage medium is referred to when necessary. Reference numeral 6 denotes a bus for transferring an address signal which instructs the respective components, which are control targets under the CPU 2, a control signal for controlling the respective components, and data mutually exchanged among the respective components.

Figure 3A:
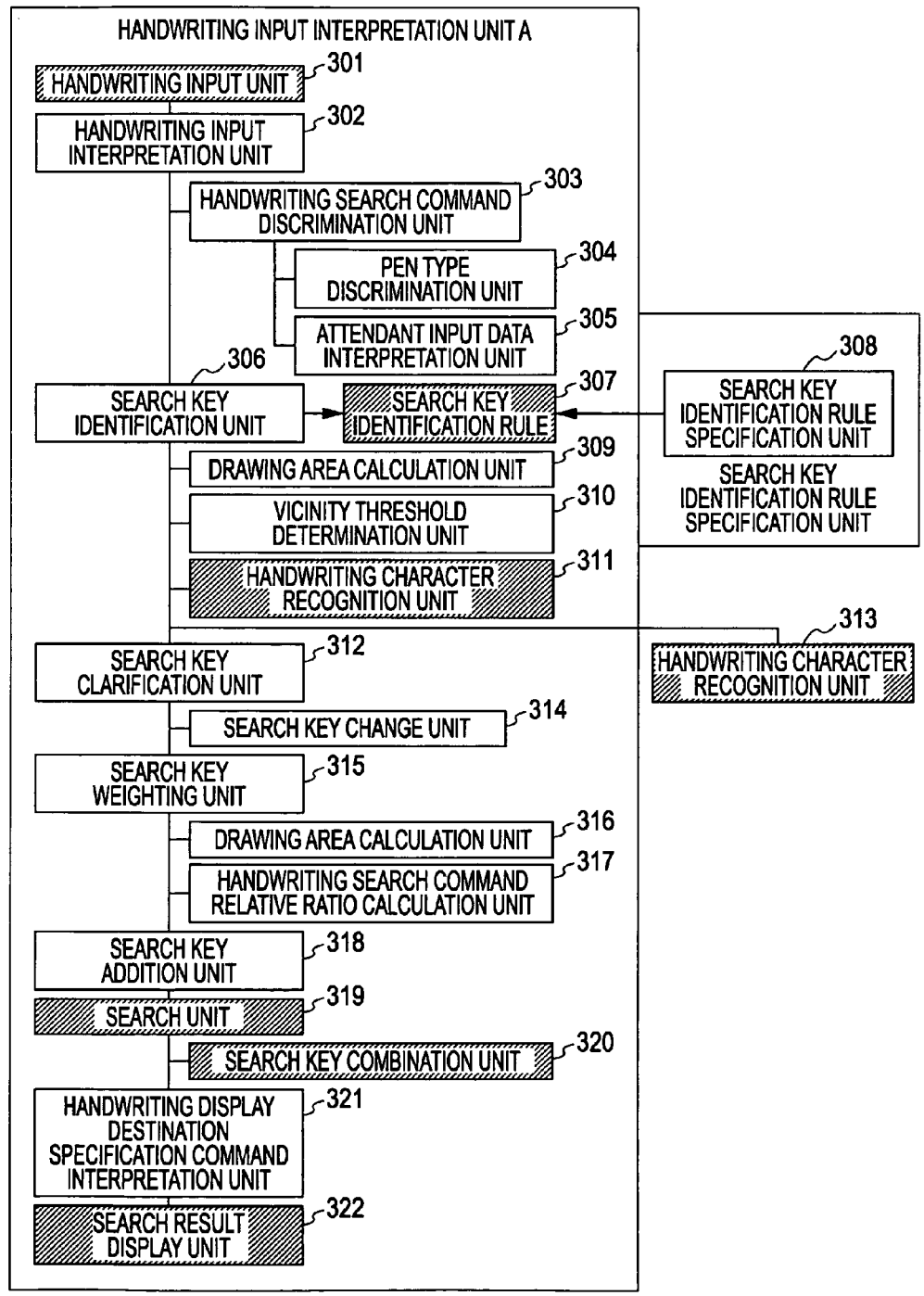
FIGS. 3A, 3B, and 3C are exemplary function block diagrams according to an embodiment of the present invention.
Figure 3B:
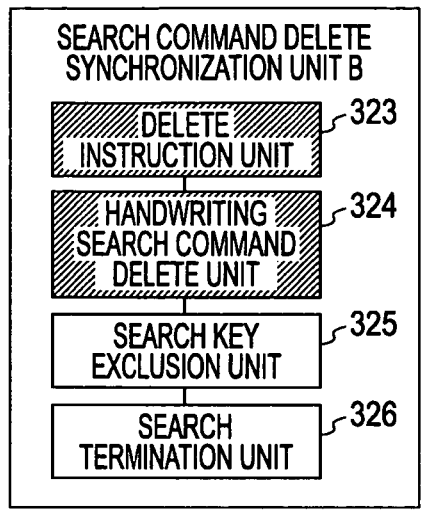
Figure 3C:
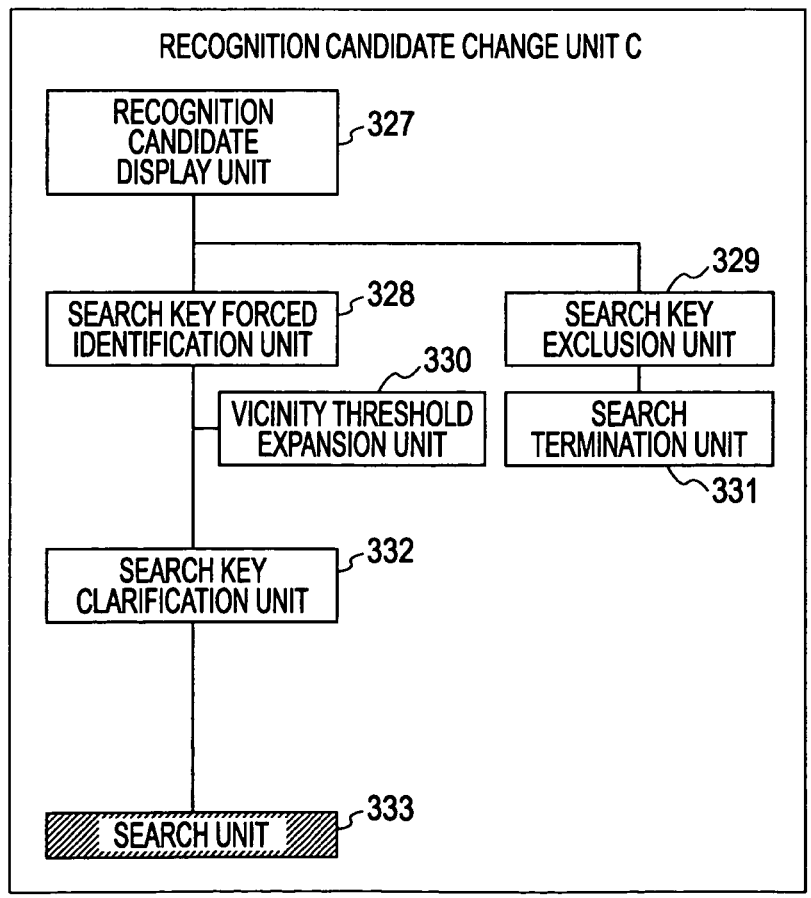

FIGS. 3A, 3B, and 3C are function block diagrams of an exemplary information processing device according to an embodiment of the present invention. The respective functions are realized by the program stored in the program memory 4 in collaboration with the CPU 2. Not all of the respective functions in the drawing are necessarily requisite functions, and other functions different from those shown in the drawing may be provided in other embodiments described below.

As shown in FIGS. 3A to 3C, the information processing device according to an embodiment of the present invention is mainly structured by the following functions A to C and a function of search key identification rule specification unit 308.

Handwriting input interpretation unit A includes handwriting input unit 301 for receiving stroke input by an operator, handwriting input interpretation unit 302 for interpreting the input, handwriting search command discrimination unit 303, pen type discrimination unit 304, and attendant input data interpretation unit 305. Furthermore, the handwriting input interpretation unit A includes search key identification unit 306 for identifying a search key indicated by the handwriting command, a search key identification rule feature 307, drawing area calculation unit 309, vicinity threshold determination unit 310, handwriting character recognition unit 311, and search key clarification unit 312 for clarifying the identified search key. In addition, the handwriting input interpretation unit A includes handwriting character recognition unit 313 for acquiring a recognition result character string when the input is not interpreted as the handwriting command, search key change unit 314, search key weighting unit 315 for, when a plurality of search keys are identified, weighting the search keys, and drawing area calculation unit 316. Moreover, the handwriting input interpretation unit A includes handwriting search command relative ratio calculation unit 317, search key addition unit 318 for adding newly identified search key, search unit 319, and search key combination unit 320. Also, the handwriting input interpretation unit A includes handwriting display destination specification command interpretation unit 321 for specifying a search result display destination, search result display unit 322, and the like.

Referring to FIG. 3B, search command delete synchronization unit B includes delete instruction unit 323 for receiving a delete instruction from the operator and handwriting search command delete unit 324 for deleting the corresponding search command. Furthermore, search key exclusion unit 325 for deleting the corresponding search key from search conditions and search termination unit 326 for terminating the search when there is no search key left as the result of the exclusion.

Referring to FIG. 3C, recognition candidate change unit C includes recognition candidate display unit 327 for displaying recognition candidates and receiving a change instruction by the operator and search key forced identification unit 328 for forcedly identifying a search key when a search command is selected as a result of the change instruction. Furthermore, the recognition candidate change unit C includes search key exclusion unit 329 when a command other than the search command is selected the corresponding search key is deleted from the search conditions, vicinity threshold expansion unit 330, search termination unit 331, search key clarification unit 332 for clarifying the identified search key, search unit 333, and the like.

With reference to FIGS. 2 to 18, a description will be given of an example where the handwriting search command input in the vicinity of displayed data is interpreted to identify a search key for performing search according to a first embodiment of the present invention. Then a description will be given of an example where the identified search key is clarified, and when the identified search key is incorrect, a change instruction is accepted. In addition, a description will be given of an example where the identified stroke data is recognized to search the data as a character string.

Figure 2:
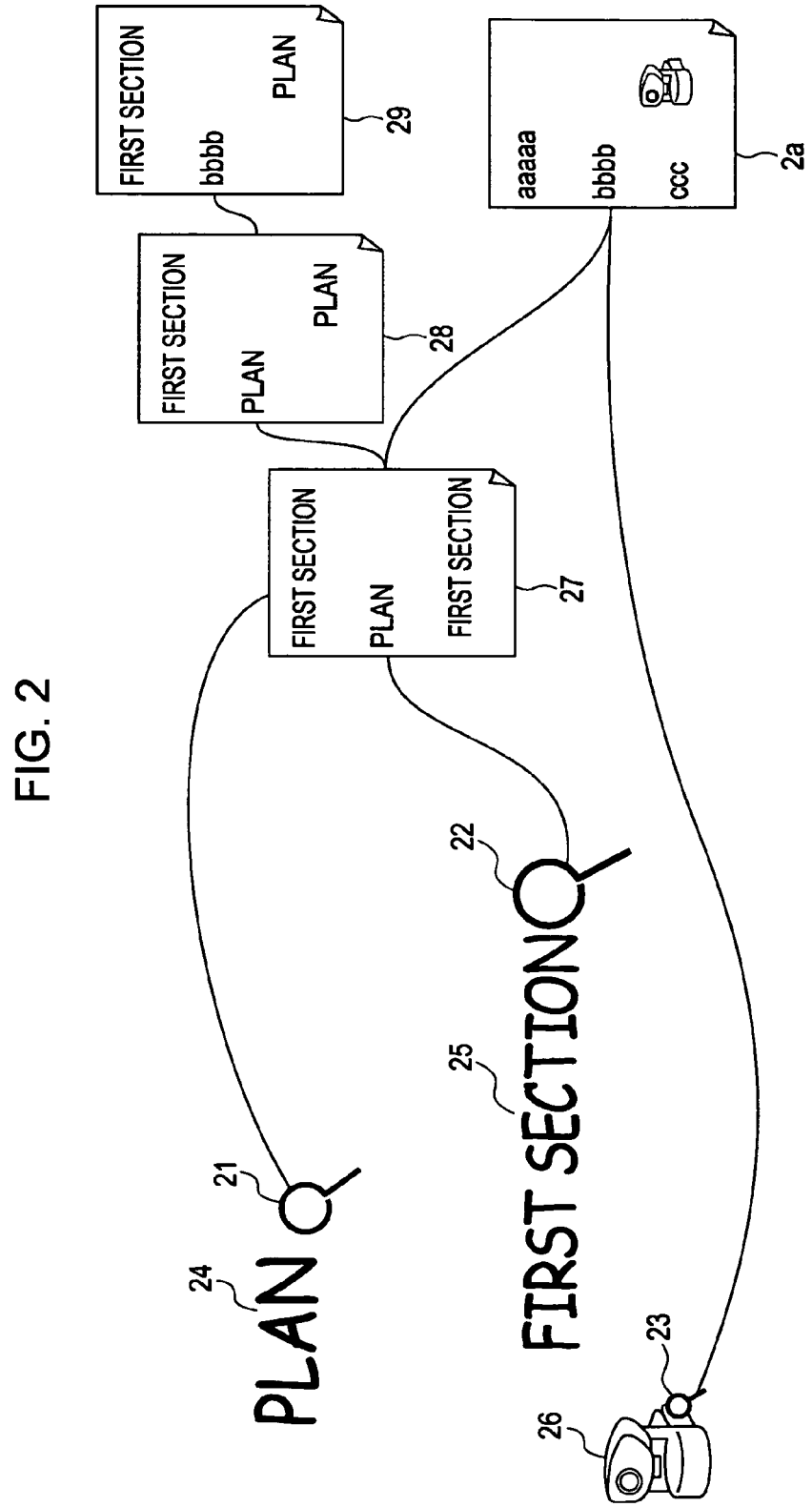
FIG. 2 shows an example of a display screen according to a first embodiment of the present invention.

FIG. 2 shows an example of a screen displayed on a display according to the first embodiment. Handwriting strokes 24 and 25 and an image 26 are drawing objects in the display screen. Reference numerals 21, 22, and 23 denote handwriting search commands for these drawing objects and reference numerals 27, 28, 29, and 2a denote search results based on these instructions. The search results are aligned so that the results with higher conformity are positioned in the left. Then, the search results are associated with the conforming handwriting search commands, and furthermore each of the search results is also subjected to such association.

Figure 4:
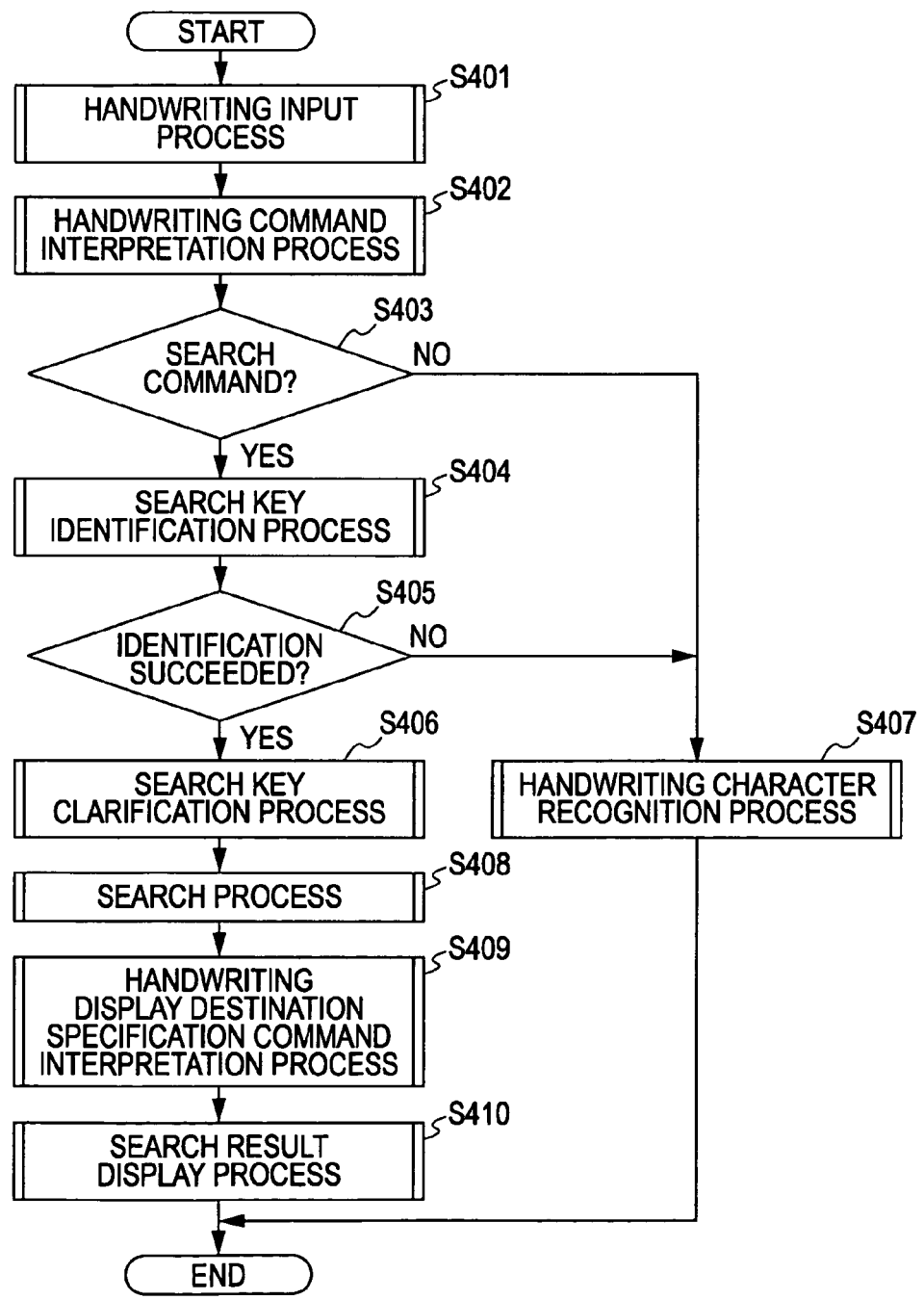
FIG. 4 is a flow diagram showing an exemplary manual input interpretation process according to the first embodiment.

FIG. 4 is a diagram showing a flow of a manual input interpretation process by the handwriting input interpretation unit A according to this embodiment. Stroke input by an operator is received in a handwriting input process in S401, and then the input stroke is interpreted as the handwriting command in a handwriting command interpretation process in S402. As a result, when it is determined in S403 that the input stroke is the handwriting search command, in a search key identification process in S404 the corresponding search key is identified for the handwriting search command.

In S405, when it is determined that the search key identification is success, the identified search key is clarified in a search key clarification process in S406, and when necessary, the search key change is received. Then a search process in S408 is performed for the search. In a handwriting display destination specification command interpretation process in S409, handwriting display destination specification commands that are continuously input by the handwriting search command are interpreted, and next in a search result display process in S410, the search result is displayed in accordance with the specification to end the process.

On the other hand, when it is not determined in S403 that the input stroke is the handwriting search command or it is not determined in S405 that the search key identification is success, the input stroke is recognized as a character in a handwriting character recognition process to end the process in S407.

Figures 5, 6:
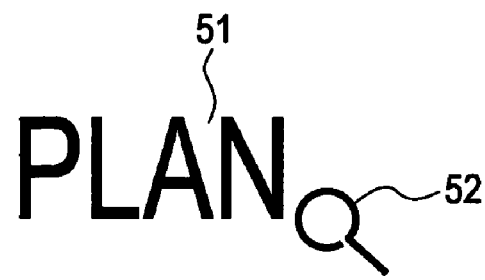
FIG. 5 shows an example of a handwriting command according to the first embodiment.
FIG. 6 shows an example of a handwriting command data base.

FIG. 5 shows an example of the handwriting search command according to this embodiment. As shown in the drawing, in the vicinity of a character string object "plan" 51, the state is shown where a handwriting search command 52 is input in the form of handwriting.

FIG. 6 shows an example of handwriting command database that stores list information of the handwriting commands referred to by the handwriting input interpretation unit 302. In the respective handwriting commands, there are specified stroke data for determining the coincidence with the input stroke, the command type, and the possibility as to whether or not a display destination specification operation described below will be accompanied. For example, in a handwriting command 61, specification of a "delete" command and definition of the absence of display destination specification are made other than the stroke data, and in a handwriting command 62, specification of a "search" command and definition of the presence of display destination specification are made other than the stroke data. Then, in a handwriting command 63, specification of a "copy" command and definition of the absence of display destination specification are made.

Figure 7:
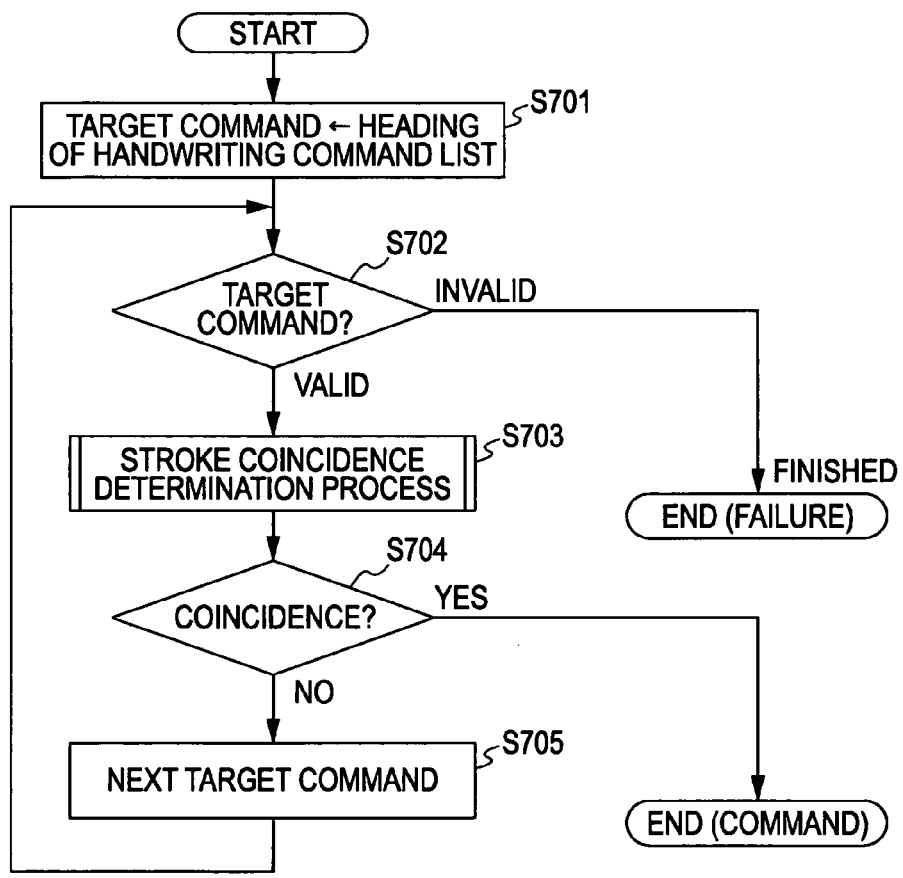
FIG. 7 is a flow diagram showing an exemplary handwriting command interpretation process.

FIG. 7 is a diagram showing a flow of an exemplary handwriting command interpretation process by the handwriting input interpretation unit 302 according to this embodiment. The process target command is set to the heading of the handwriting command list for resetting in S701. When it is determined in S702 that the target command is valid, in a stroke coincidence determination process in S703, the coincidence between the handwriting strokes input by the operator and the stroke data of the target command is determined. As the result of the determination, when the coincidence is confirmed in S704, the process is ended while the command is taken as a return value. When the coincidence is not confirmed in S704, the target command is carried forward in S705 and the process returns to S702. When it is determined in S702 that the target command is invalid, no handwriting command corresponding to the input stroke exists to thereby end the process.

Figures 8, 9:
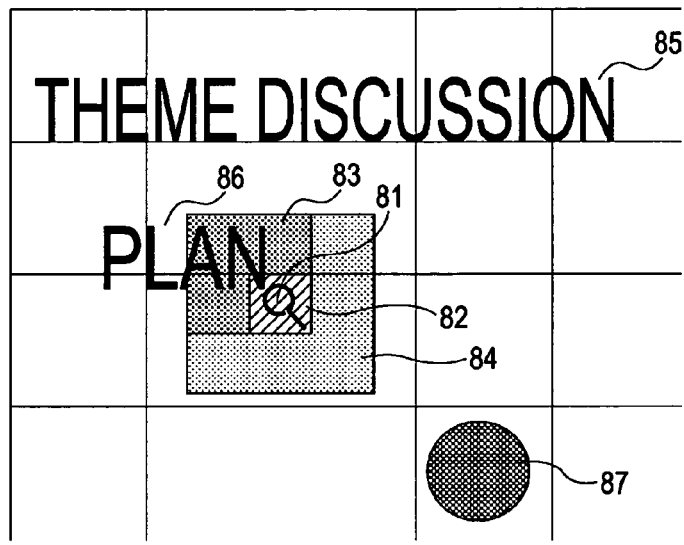
FIG. 8 shows an example of a search key identification area.
FIG. 9 shows an example of a search key identification rule.

FIG. 8 shows an example of a search key identification area according to this embodiment. In this area, character string objects "theme discussion" 85 and "plan" 86, and a graphic object 87 are displayed. Then, in the vicinity of a character string object 86, the state is shown where a handwriting search command 81 is input in the form of handwriting. Areas including a handwriting search command inner drawing area 82, an upper left vicinity 83, and a vicinity 84 corresponding to search key identification rule that will be described late are shown in the drawing. In addition, the state is shown where the areas of the character string object 86, the handwriting search command inner drawing area 82, and the upper left vicinity 83 are overlapped one another.

FIG. 9 shows an example of the search key identification rule referred to by search key identification unit 306 that will be described later. As shown in the drawing, a priority 91 is defined in the stated order of (1) the handwriting search command inner drawing area, (2) the upper left vicinity, and (3) the vicinity. A vicinity ratio 92 is defined as 3 fold of the handwriting search command drawing area and a weight ratio 93 is defined as 1 fold of the handwriting search command drawing area ratio.

Figure 10:
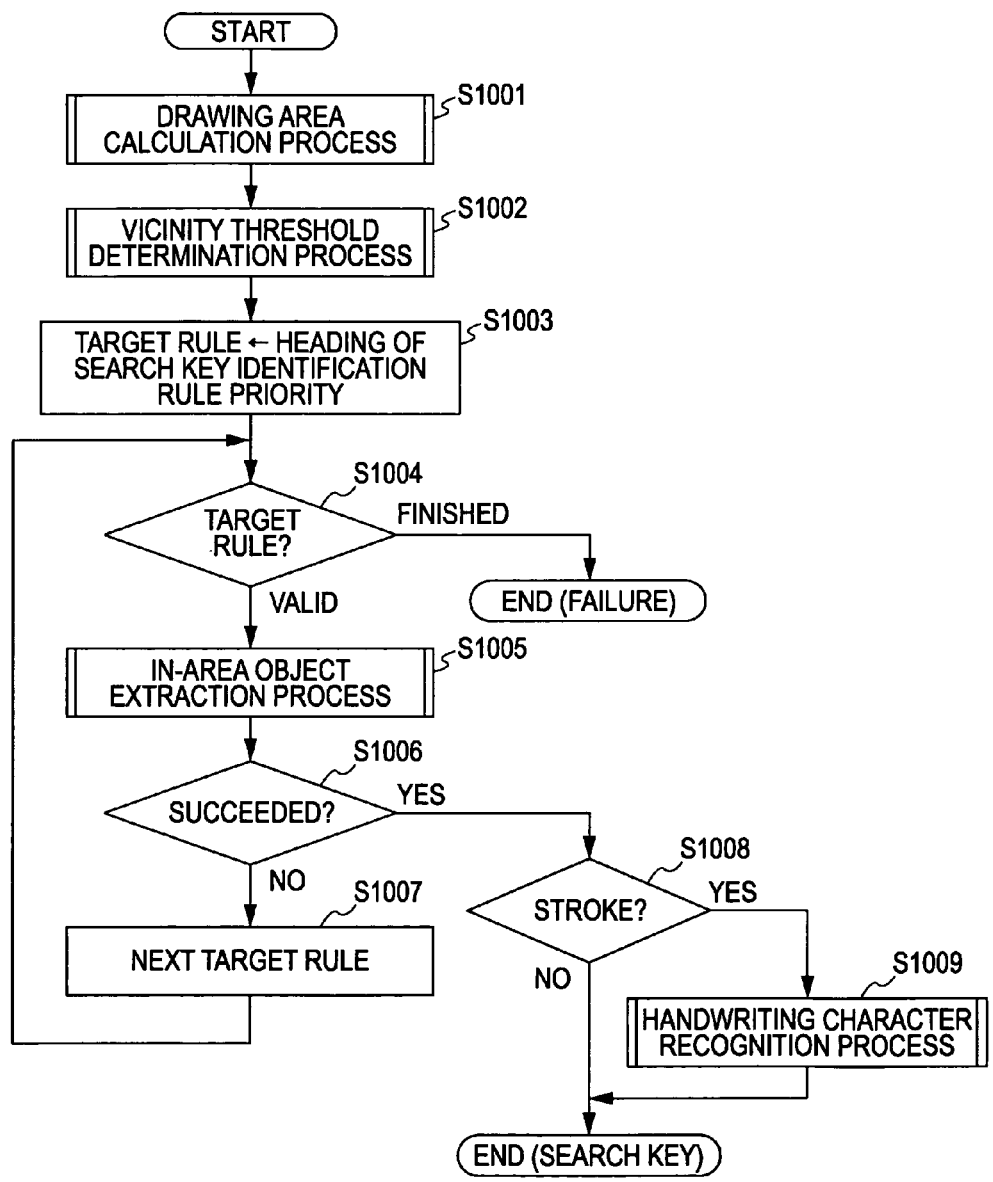
FIG. 10 is a flow diagram showing an exemplary search key identification process.

FIG. 10 is a flow diagram showing an exemplary search key identification process by the search key identification unit 306 according to this embodiment. The drawing area calculation unit 309 calculates a handwriting search command drawing area in a drawing area calculation process in S1001. In S1002, the vicinity threshold determination unit 310 determines a vicinity threshold used for a process described below on the basis of the handwriting search command drawing area value.

In S1003, the process target rule is reset at the heading of the priority order defined by the search key identification rule. When the target rule is valid in S1004, overlapping objects in the identified target area determined by the vicinity threshold are extracted an in-area object extraction process in S1005. When the extraction is determined to be success in S1006, it is determined whether or not the extracted objects are the handwriting strokes in S1008. In the case of the handwriting strokes, the result of the character recognition in a handwriting character recognition process in S1009 is set as a search key and the process ends. When the extraction is not determined to be success in S1006, the target rule is carried forward to the next target rule in S1007. Then, the flow returns to S1004 again to repeatedly execute the processes. When the target rules are finished in S1004, there is no search key left in the identified area to end the process.

Figure 11:
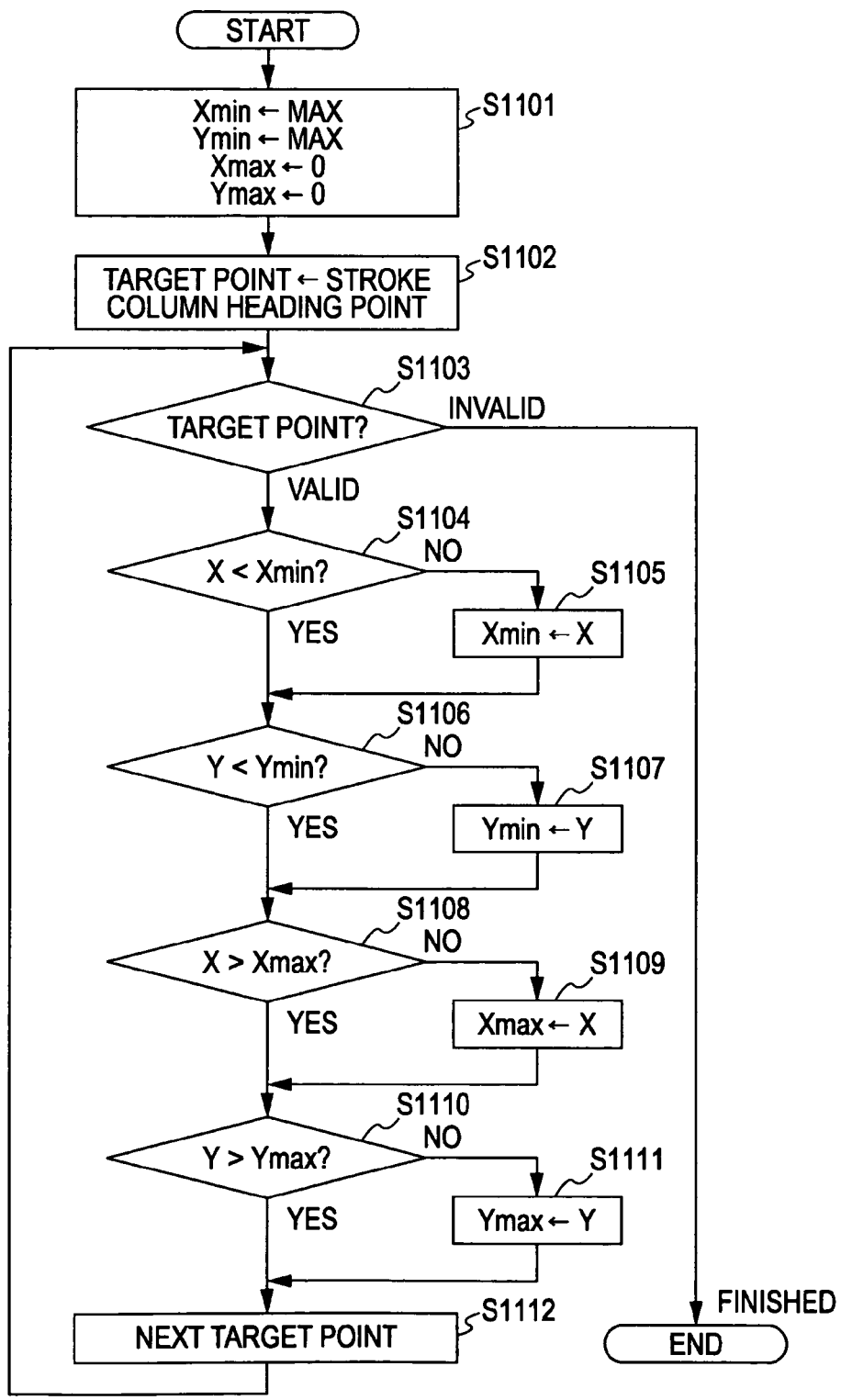
FIG. 11 is a flow diagram showing an exemplary drawing area calculation process.

FIG. 11 is a flow diagram showing an exemplary drawing area calculation process by the drawing area calculation unit 309 according to this embodiment. In S1101, a coordinate of the drawing area is reset. In S1102, the target point is reset to the heading point of the stroke column, and the following processes are repeatedly executed until the target becomes invalid in S1103. When the target is determined to be valid in S1103, the coordinate of the drawing area is updated in processes from S1104 to S1111 to carry forward the targets in Step S1112, and the flow returns to S1103 again to repeatedly execute the processes.

Figure 12:
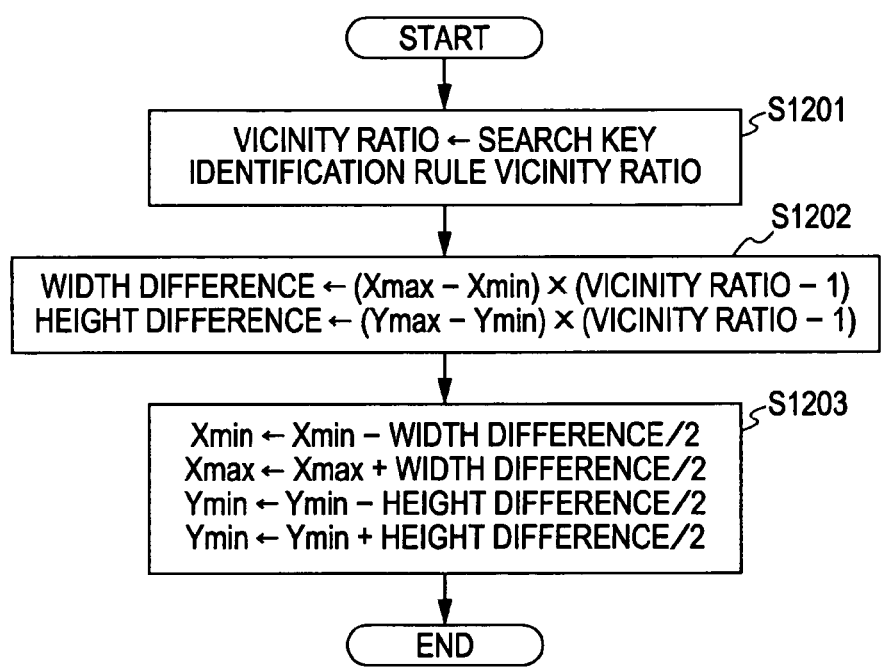
FIG. 12 is a flow diagram showing an exemplary vicinity threshold determination process.

FIG. 12 is a flow diagram showing an exemplary vicinity threshold determination process by the vicinity threshold determination unit 310 according to this embodiment. In S1201, the vicinity ratio is reset to the vicinity ratio defined by the search key identification rule. In S1202, the width difference and the height difference are determined by multiplying by (the vicinity ratio−1). In S1203, on the basis of the width difference and the height difference, the vicinity threshold is determined to end the process.

Figures 13, 14:
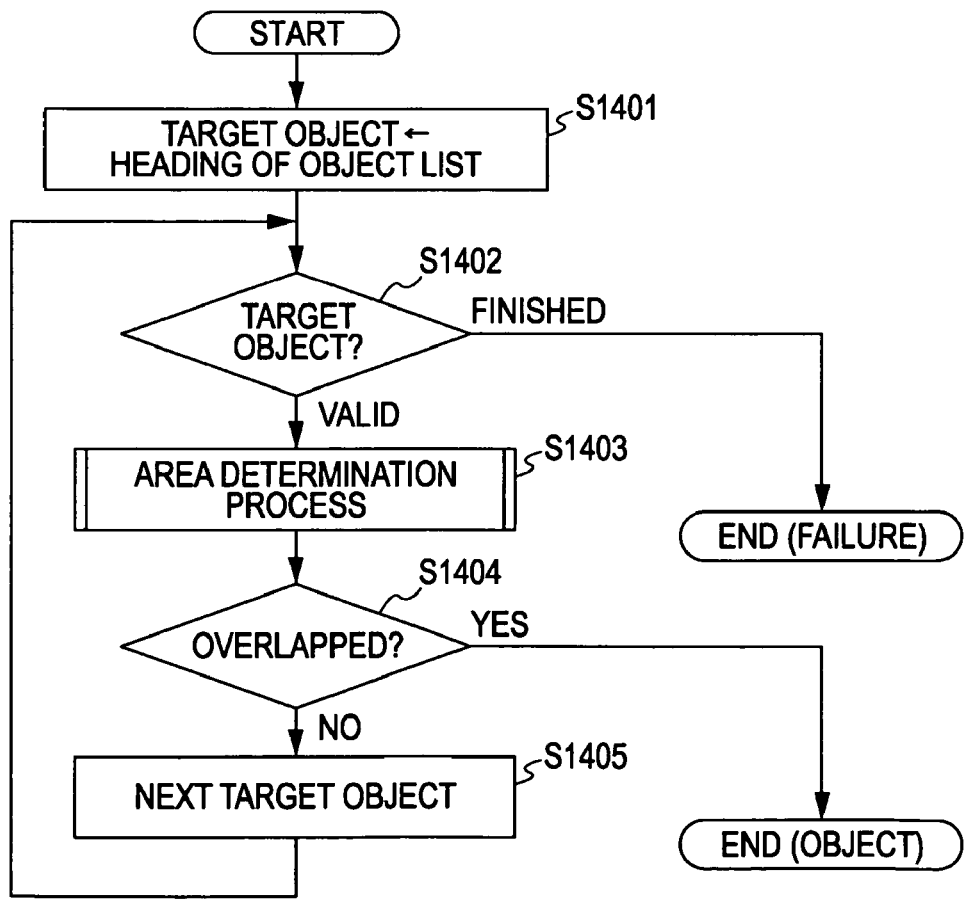
FIG. 13 shows an example of an object list.
FIG. 14 is a flow diagram showing an exemplary in-area object extraction process.

FIG. 13 shows a list of the respective drawing objects described in the search key identification area example of FIG. 8 according to this embodiment. Reference numerals 131 to 133 denote objects. In this drawing, each object has coordinates of the starting point and the ending point. For example, an object "plan" 132 has coordinates of the starting point (50, 150) and the ending point (200, 230).

FIG. 14 is a flow diagram showing an exemplary in-area object extraction process according to this embodiment. In S1401, the target is reset to the heading of the entire object list, and until the target becomes invalid the following processes are repeatedly executed. In S1402, when the target is determined to be valid, it is determined whether or not the target object is overlapped with the determination area in an area determination process in S1403. When it is determined in Step S1404 that the target object is overlapped with the determination area, the target object is returned to end the process. When it is not determined in Step S1404 that the target object is overlapped with the determination area, the target is carried forward to the next target in S1405. Then, the flow returns to S1402 again to repeatedly execute the processes.

Figure 15:
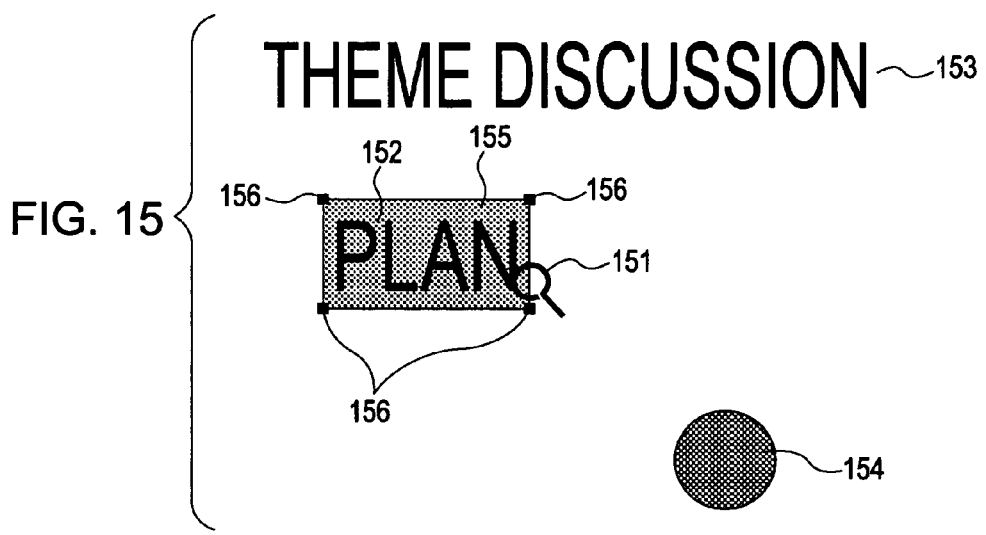
FIG. 15 shows an example of search key clarification.

FIG. 15 shows an example of the clarified search key according to this embodiment. Reference numeral 151 denotes a handwriting search command, reference numerals 152 and 153 denote character string objects, reference numeral 154 denotes a and a graphic object, reference numeral 155 denotes a search key clarification area, and reference numeral 156 denotes search key change drag points. In this drawing, the state is shown where the identified search key 152 is clarified by way of the background color inversion 155 based on the search command 151. Also, the drag points 156 required for changing the search key are displayed at the same time, making it possible to perform the change instruction operation.

Figure 16:
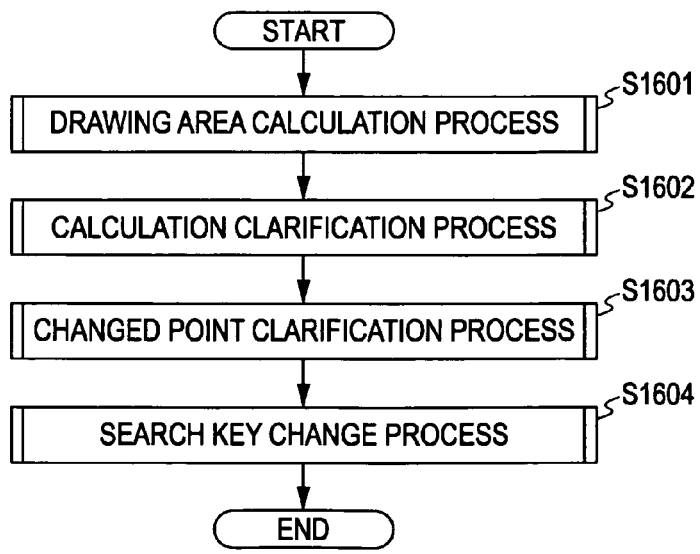
FIG. 16 is a flow diagram showing an exemplary search key clarification process.

FIG. 16 is a flow diagram showing an exemplary search key clarification process performed by the search key clarification unit 312 according to this embodiment. In a drawing area calculation process in S1601, a search key drawing area is calculated, and a search key is clarified by inversing the background color of the calculated area in an area clarification process in S1602. Furthermore, in a change point clarification process in S1603, the drag points are clarified at four corners of the search key drawing area, and then in a search key change process in S1604, the change operation for instructing the drag points is dealt with to end the process.

Figure 17:
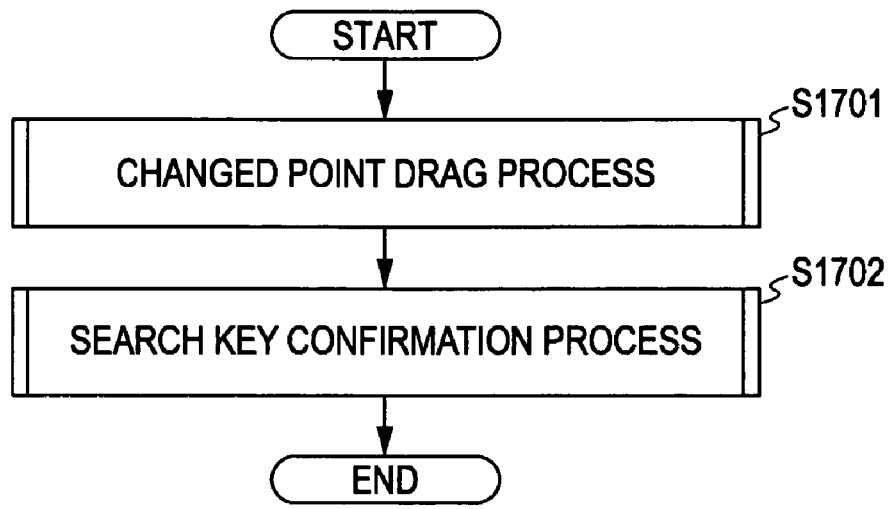
FIG. 17 is a flow diagram showing an exemplary search key change process.

FIG. 17 is a flow diagram showing an exemplary search key change process performed by the search key clarification unit 314 according to this embodiment. In a change point drag process in S1701, change operation for instructing the drag points is received, and then in a search key confirmation process in S1702, the corresponding search key is confirmed in the change content to end the process.

Figure 18:
FIG. 18 shows an example of handwriting strokes.

FIG. 18 shows an example where a search instruction operation in which the handwriting strokes 181 are treated as search keys is performed according to this embodiment. Based on a search command 182, the identified search key are the handwriting strokes and recognized in a handwriting character recognition process in S1009 by the search key identification unit shown in FIG. 10. Thus, the above-mentioned process is executed while a character string "plan" is treated as the search key.

As described above, according to this embodiment of the present invention, the command target can be identified and executed without command target range specification. In particular, the search key can be identified and searched for without the range specification of the search key, whereby the operability is improved. Furthermore, the specification can be performed without the range specification of the command target can be performed for execution in accordance with the rule with priority. Also, the identification range of the command target can be specified on the basis of the handwriting search command size. In addition, the displayed data that is identified as the command target can be clarified. Moreover, the range of the displayed data that is misidentified as the command target can be changed. Then, the displayed stroke data that is identified as the command target can be used for the search key as a character string. Also, the handwriting character input and the handwriting search command input can be used in combination.

Second Exemplary Embodiment

According to a second embodiment, with reference to FIGS. 19 to 28, an example where a plurality of handwriting search commands that are input in the vicinity of displayed data are interpreted to identify a search key for performing a search. In addition, an example where weighting on a plurality of search keys is changed on the basis of the input handwriting search command size will be described. Also, an example where weighting on a plurality of search keys is changed on the basis of the size ratio between the input handwriting search command and the corresponding search key will be described. Furthermore, an example where by deleting the search command, the corresponding search key is excluded from search conditions or the search is terminated will be described.

Figure 19:
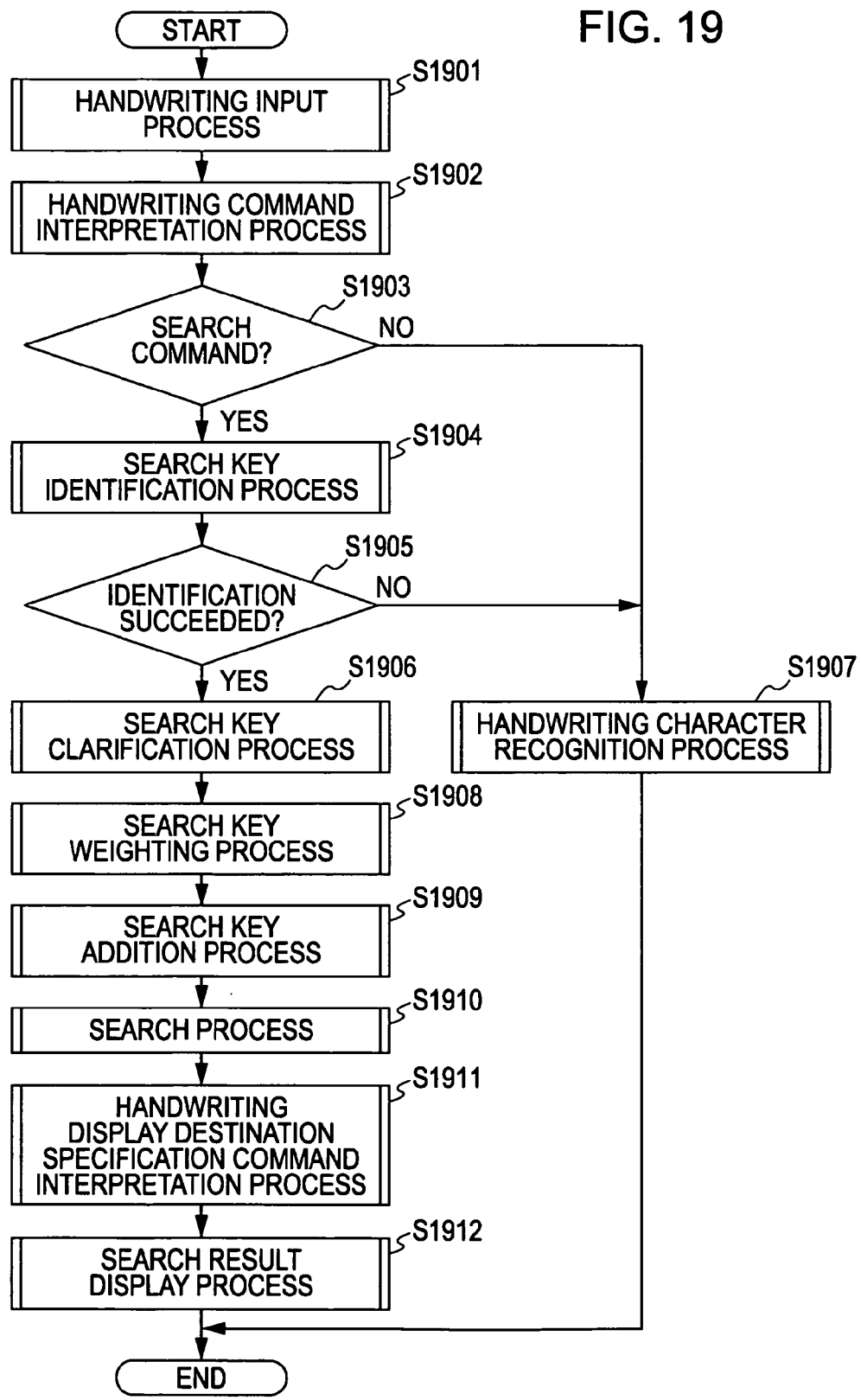
FIG. 19 is a flow diagram showing an exemplary handwriting input interpretation process.

FIG. 19 is a flow diagram showing an exemplary handwriting input interpretation process by the handwriting input interpretation unit A according to this embodiment. In a handwriting input process in S1901, stroke input by an operator is received. In a handwriting command interpretation process in S1902, the input stroke is interpreted as a handwriting command. When it is determined in S1903 that the interpretation result is the handwriting search command, the corresponding search key is identified for the handwriting search command in a search key identification process in S1904. As a result, when it is determined in S1905 that the search key identification is success, the identified search key is clarified in a search key clarification process in S1906, and when necessary, the search key change is received. Subsequently, the weighting on each search key is determined in a search key weighting process in S1908, the search key is added to the search conditions in a search key addition process in S1909, and then the search is performed in a search process in Step S1910. In a handwriting display destination specification command interpretation process in S1911, a handwriting display destination specification commands that are continuously input to the handwriting search command are interpreted. Next in Step S1912, in a search result display process, the search result is displayed in accordance with the specification to thereby end the process.

On the other hand, when it is not determined in S1903 that the interpretation result is the handwriting search command or when it is not determined in S1905 that the search key identification is success, the input stroke is recognized as a character in a handwriting character recognition process in S1907 to thereby end the process.

Figures 20, 21:
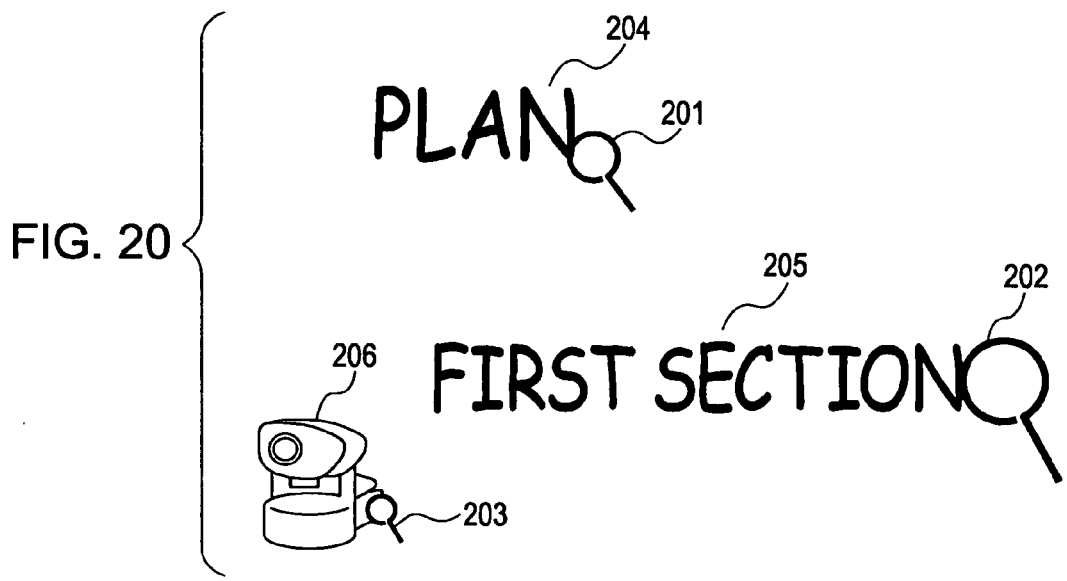
FIG. 20 shows an example of a combination of plural search keys.
FIG. 21 shows an exemplary drawing area size search command list for plural search commands.

FIG. 20 shows an example where a plurality of input handwriting search commands according to this embodiment. In this drawing, the state is shown where handwriting search commands 201, 202, and 203 are input in the form of handwriting in the vicinity of handwriting stroke objects 204 and 205, and an image object 206.

FIG. 21 shows a list including entries 211 through 213 of the drawing area size and the size ratio of the respective handwriting search commands of FIG. 20 according to this embodiment. For example, according to a list 212 of this drawing, there are indicated a handwriting search command ID of 202, a drawing area size of 50×40=2000, and a size ratio of 20 as compared with a minimum drawing area 213.

Figure 22:
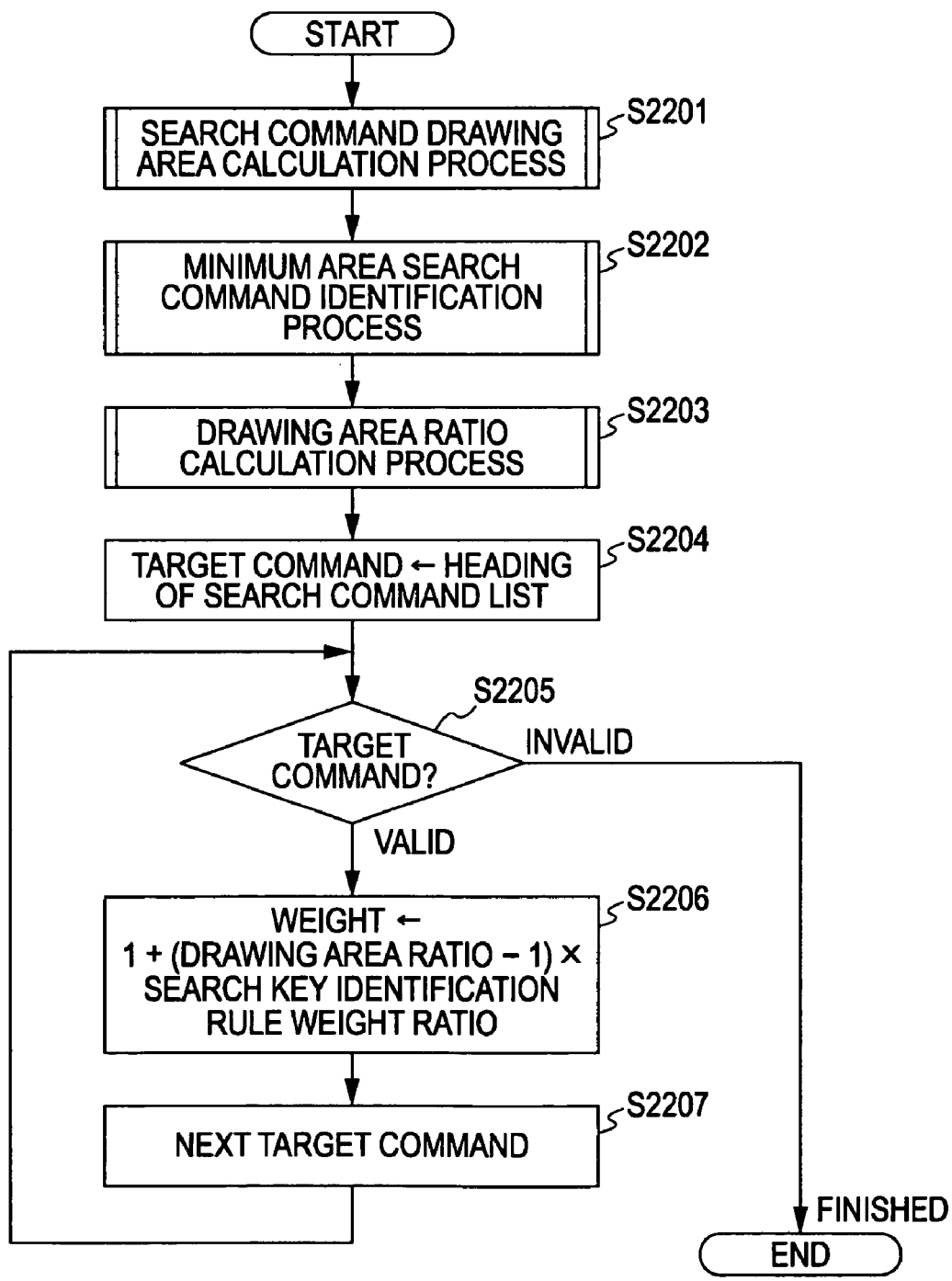
FIG. 22 is a flow diagram showing an exemplary search key weighting process.

FIG. 22 is a flow diagram of an exemplary search key weighting process by the search key weighting unit 315 according to this embodiment. The drawing area calculation unit 316 calculates the drawing area size, which has been described in FIG. 21, in a search command drawing area calculation process in S2201. Then, in a minimum area search command identification process in S2202, a search command having the minimum drawing area is identified among the search commands described in FIG. 21. Subsequently, in a drawing area ratio calculation process in S2203, it is possible to find out the size ratio as compared to the minimum drawing area described in described in FIG. 21.

In S2204, the process target is reset to the heading of the search command list, and in S2205, the following process will be repeatedly executed until the target becomes invalid. When the target is determined to be valid in S2205, and in Step S2206, the weighting on the corresponding search key is determined as [1+(drawing area ratio−1)×search key identification rule weight ratio]. In S2207, the target is carried forward, and the flow returns to Step S2205 again to repeatedly execute the processes.

Figures 23, 24:
FIG. 23 shows an example of plural weighted search keys.
FIG. 24 shows an example of a relative search command ratio.

FIG. 23 shows an example of the search key weighting determined by the above-mentioned search key weighting process according to this embodiment. For example, according to a list 231 of this drawing, the state is shown where the search key ID=204 and the weight of 4 are determined. Similarly, lists 232 and 233 represent the state where the search key IDs=205 and 206 and the weights of 20 and 1 are determined, respectively.

FIG. 24 shows a list of entries 241 through 243 of the drawing area size of the respective handwriting search commands, the drawing area size of the corresponding search key, and the search command drawing area size ratio and the rate of ratio with respect of the search key according to this embodiment. For example, according to list entry 242 of this drawing, there are shown a handwriting search command ID=202, a drawing area size of 50×40=2000, a handwriting search key ID=205, and a drawing area size of 30×100=3000. Also, it is understood that the rate of ratio of the search command drawing area size with respect to the search key is 0.67, and the rate of ratio is 11.2 with respect to the minimum drawing area size ratio of 243.

Figure 25:
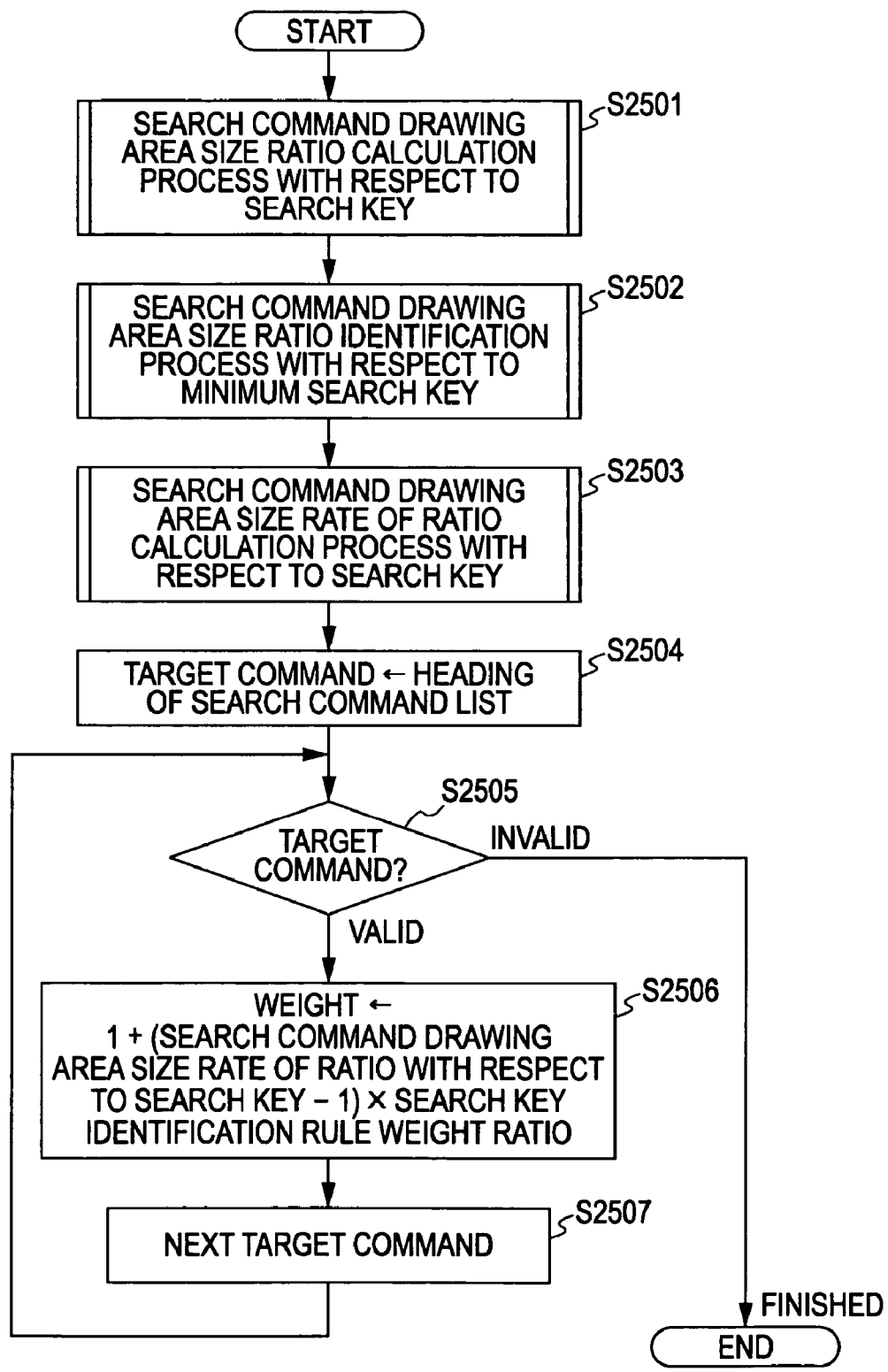
FIG. 25 is a flow diagram showing an exemplary search key weighting process.

FIG. 25 is a flow diagram showing an exemplary search key weighting process with the use of the search command drawing area size ratio with respect to the search key according to this embodiment. In S2501, in a search command drawing area size ratio calculation process for the search key, the search command drawing area size ratio with respect to the search key described in FIG. 24 is calculated. In the search command drawing area size ratio identification process with respect to the minimum search key in S2502, a search command having the minimum search command drawing area size ratio with respect to the search key is identified among the search commands described in FIG. 24. In S2503, in a calculation process of the rate of ratio for the search command drawing area size with respect to search key, the rate of ratio is calculated with respect to the minimum drawing area size ratio described in FIG. 24.

In S2504, the process target is reset to the heading of the search command list, and in S2505, the following processes will be repeatedly executed until the target becomes invalid. When the target is determined to be valid in S2505, the weighting on the corresponding search key is determined as [1+(search command drawing area size rate of ratio−1)×search key identification rule weight ratio] in S2506. Then, in S2507, the target is carried forward, and the flow returns to Step S2505 again to repeatedly execute the processes.

Figure 26:
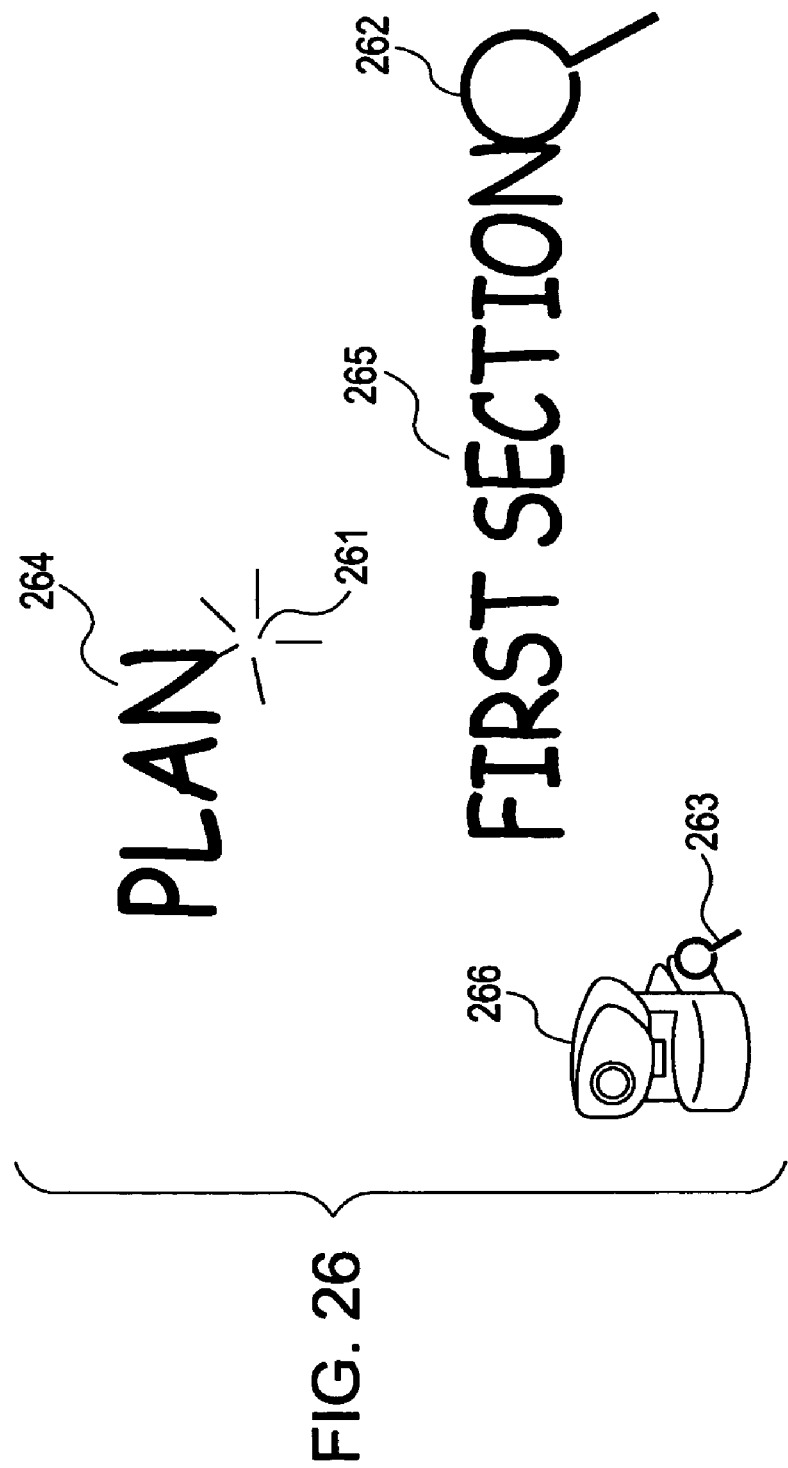
FIG. 26 shows an example of search command deletion.

FIG. 26 shows an example where one handwriting search command is deleted from a plurality of input handwriting search commands in this embodiment. In this drawing, the state is shown where the handwriting search command 261 is deleted from handwriting search commands 261, 262, and 263 that are input in the vicinity of handwriting stroke objects 264 and 265, and an image object 266.

Figure 27:
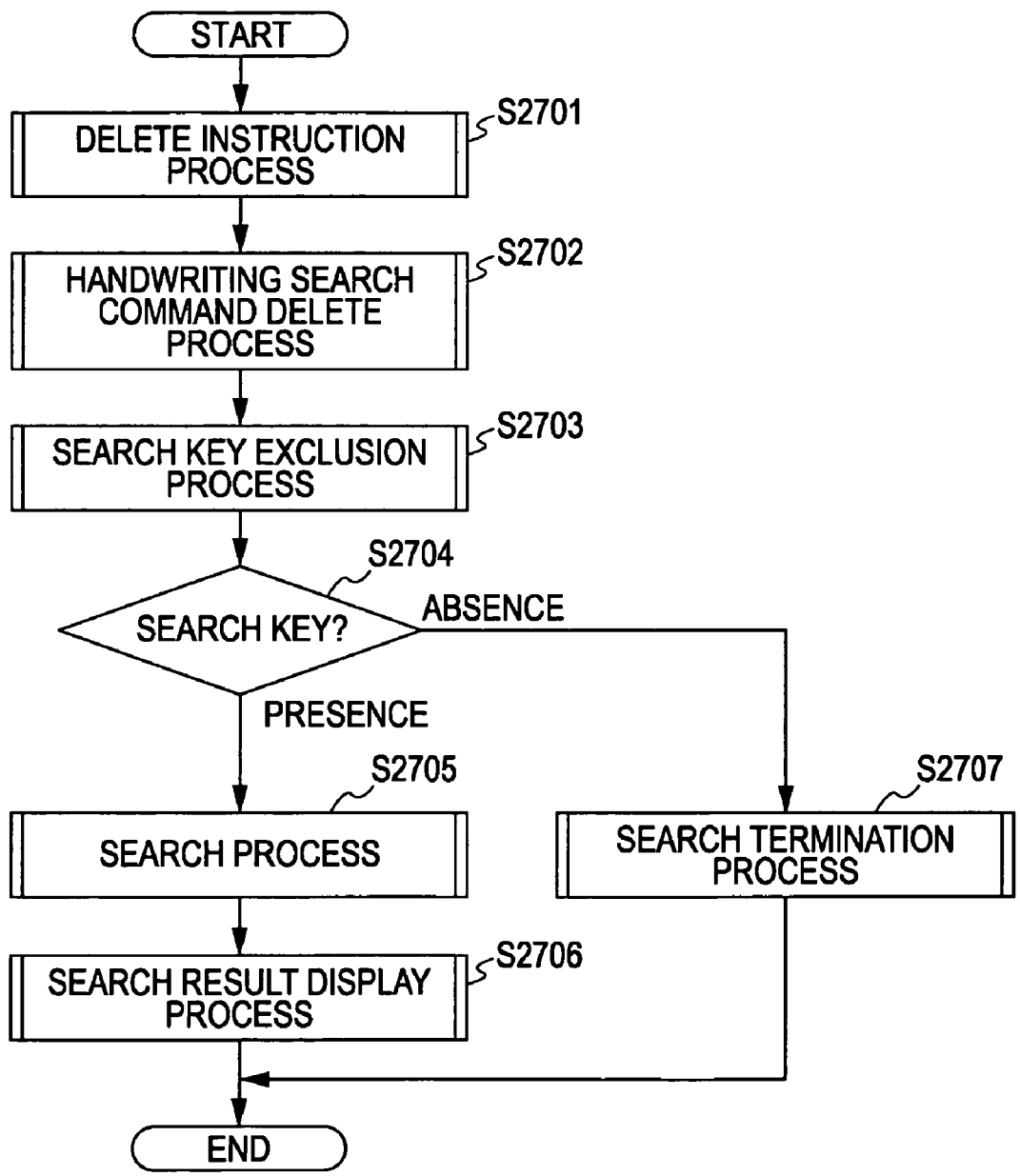
FIG. 27 is a flow diagram showing an exemplary search command delete synchronization process.

FIG. 27 is a flow diagram showing an exemplary search command delete synchronization process performed by the search command delete synchronization unit B according to this embodiment. In a delete instruction process in S2701, a handwriting search command delete instruction process performed by the user is received. In S2702, handwriting search command delete unit 324 deletes the handwriting search command instructed in the handwriting search command deletion delete process. In S2703, the search key exclusion unit 325 extracts the search key corresponding to the deleted handwriting search command from the search conditions.

In S2704 it is determined whether or not the search key is still left in the search condition. When it is determined that the search key exists, the remaining search condition is searched for in a search process in Step S2705, and the search result is displayed in a search result display process in S2706 to end the process. On the other hand, when it is not determined in S2704 that the search key exists, search termination unit 326 terminates the search in a search termination process in S2707 to end the process.

Figure 28:
FIG. 28 shows an example of a search key after the search command deletion.

FIG. 28 shows an example where the search key is excluded in the above-mentioned search command delete synchronization process according to this embodiment. List 281 and 282 where the search key of ID=204 is excluded as compared with the lists 231 to 233 of FIG. 23 are shown.

As described above, according to this embodiment of the present invention, a plurality of input handwriting search command targets can be identified without the range specification and the respective search keys can be used in combination for executing the search, whereby the convenience is improved. Also, the weighting on the respective search keys can be specified on the basis of the handwriting search command size. In addition, the weighting on the respective search keys can be specified on the basis of the relative size between the handwriting search commands and the search keys. Furthermore, the search termination can be instructed by the deletion of the handwriting search command. Moreover, on the basis of the combination of the respective search keys, exclusion of an arbitrary search key can be instructed by the deletion of the handwriting search command.

Third Exemplary Embodiment

In a third embodiment, with reference to FIGS. 29 to 33, a description will be given of an example where the search keys are identified while a plurality of input handwriting search commands that are input in the vicinity of displayed data are interpreted as different combination search instructions to thereby perform search.

Figure 29:
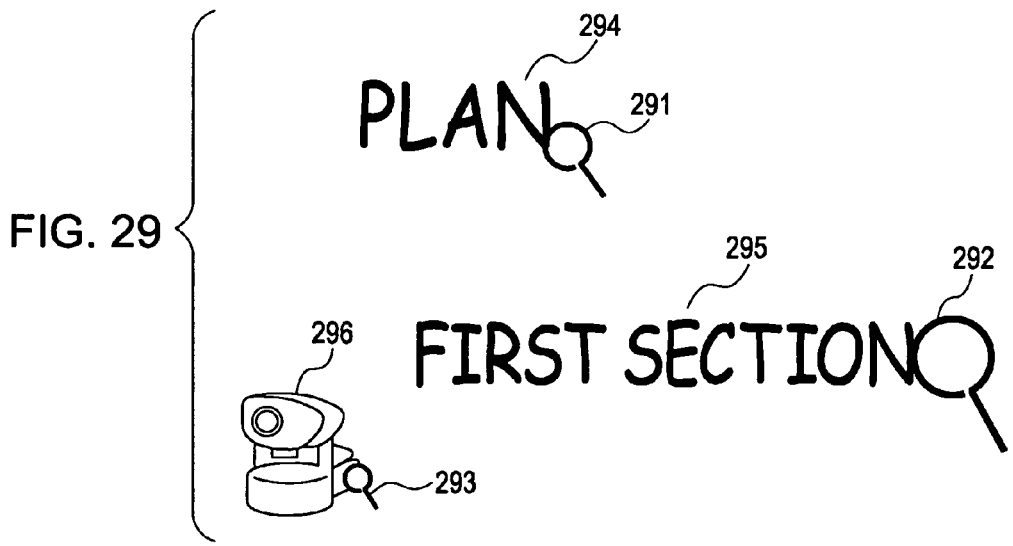
FIG. 29 shows an example of plural search instructions.

FIG. 29 shows an example where a plurality of handwriting search commands are input according to this embodiment. In this drawing, in the vicinity of handwriting stroke objects 294 and 295, and an image object 296, the state is shown where handwriting search commands 291, 292, and 293 are input in the form of handwriting. It should be noted that the handwriting search commands 291 and 292 are drawn in the pen color=red, and the handwriting search command 293 is drawn in the pen color=green.

Figure 30:
FIG. 30 shows an example of plural search conditions.

FIG. 30 shows an example of a search key according to this embodiment, where two search conditions are indicated. In this drawing, reference numerals 3001 and 3002 correspond to handwriting search commands input in the pen color=red, and search key IDs are 294 and 295, respectively. Reference numeral 3003 corresponds to a handwriting search command input in the pen color=green, and a search key ID is 296. The handwriting search commands 3001, 3002, and 3003 are recognized as search conditions 1 and 2 different from each other.

Figure 31:
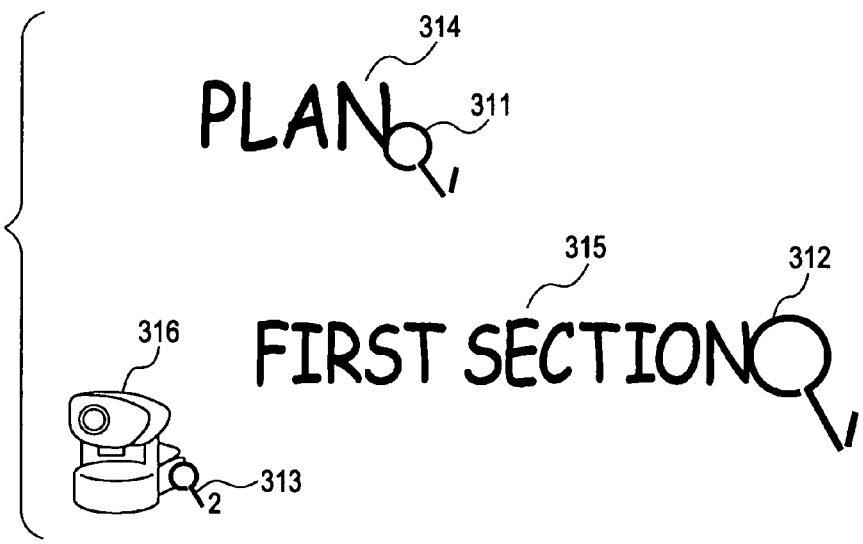
FIG. 31 shows another example of plural search instructions.

FIG. 31 shows another example where a plurality of handwriting search commands are input according to this embodiment. In this drawing, the state is shown where handwriting search commands 311, 312, and 313 are input in the form of handwriting in the vicinity of handwriting stroke objects 314 and 315, and an image object 316. Also, a number "1" is drawn in the vicinity of the handwriting search commands 311 and 312, and a number "2" is drawn in the vicinity of the handwriting search command 313.

Figure 32:
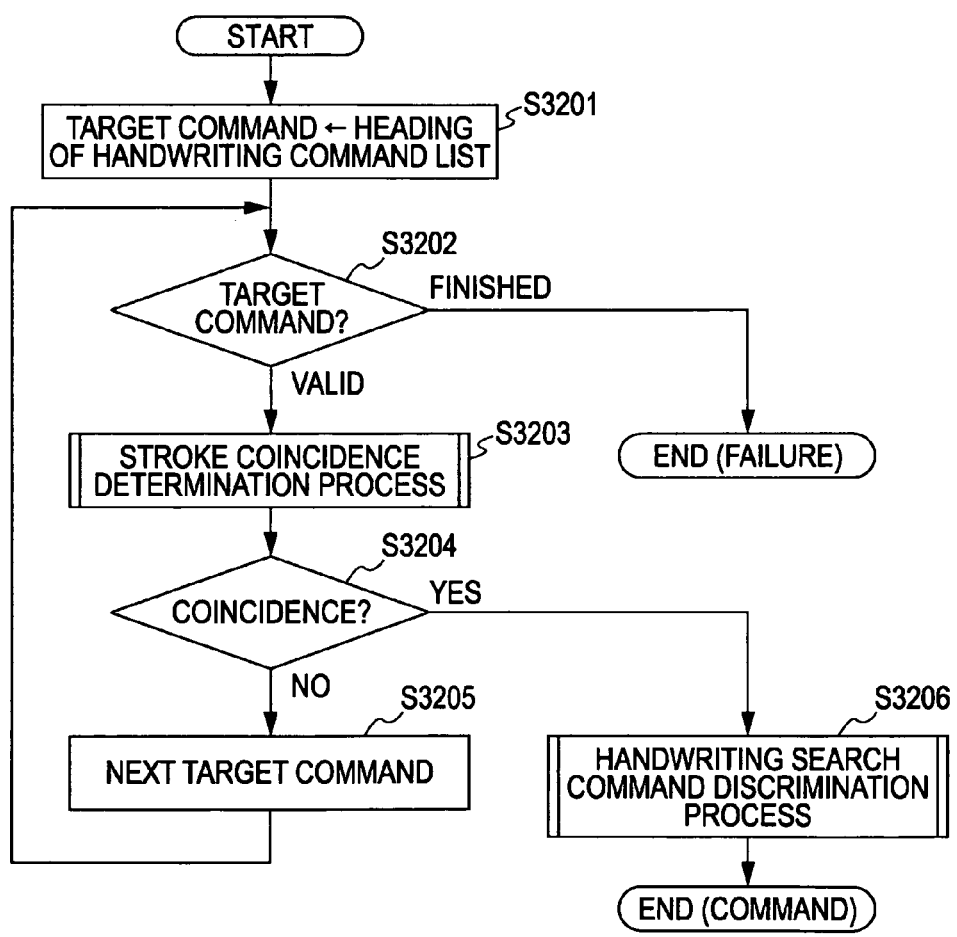
FIG. 32 is a flow diagram showing an exemplary handwriting command interpretation process.

FIG. 32 is a flow diagram showing an exemplary handwriting command interpretation process performed by handwriting input interpretation unit 302 according to this embodiment. The process target command is set to the heading of the handwriting command list for resetting in S3201, and while it is determined in S3202 that the target command is valid, the process is repeatedly performed. When it is determined in S3202 that the target command is valid, in a stroke coincidence determination process in S3203, the coincidence between handwriting strokes input by the operator and the stroke data of the target command is determined. When the coincidence is confirmed in S3204, it is determined in a handwriting search command determination process in S3206 as to which search conditions the input handwriting search commands are included, and the handwriting search commands are added to the search conditions. After that, the process is ended while the command is taken as a return value. When the coincidence is not confirmed in S3204, the target command is carried forward in S3205. The flow returns to S3202 to repeatedly execute the processes. When it is determined in S3202 that the target command is ended, no handwriting command corresponding to the input stroke exists to thereby end the process.

Figure 33:
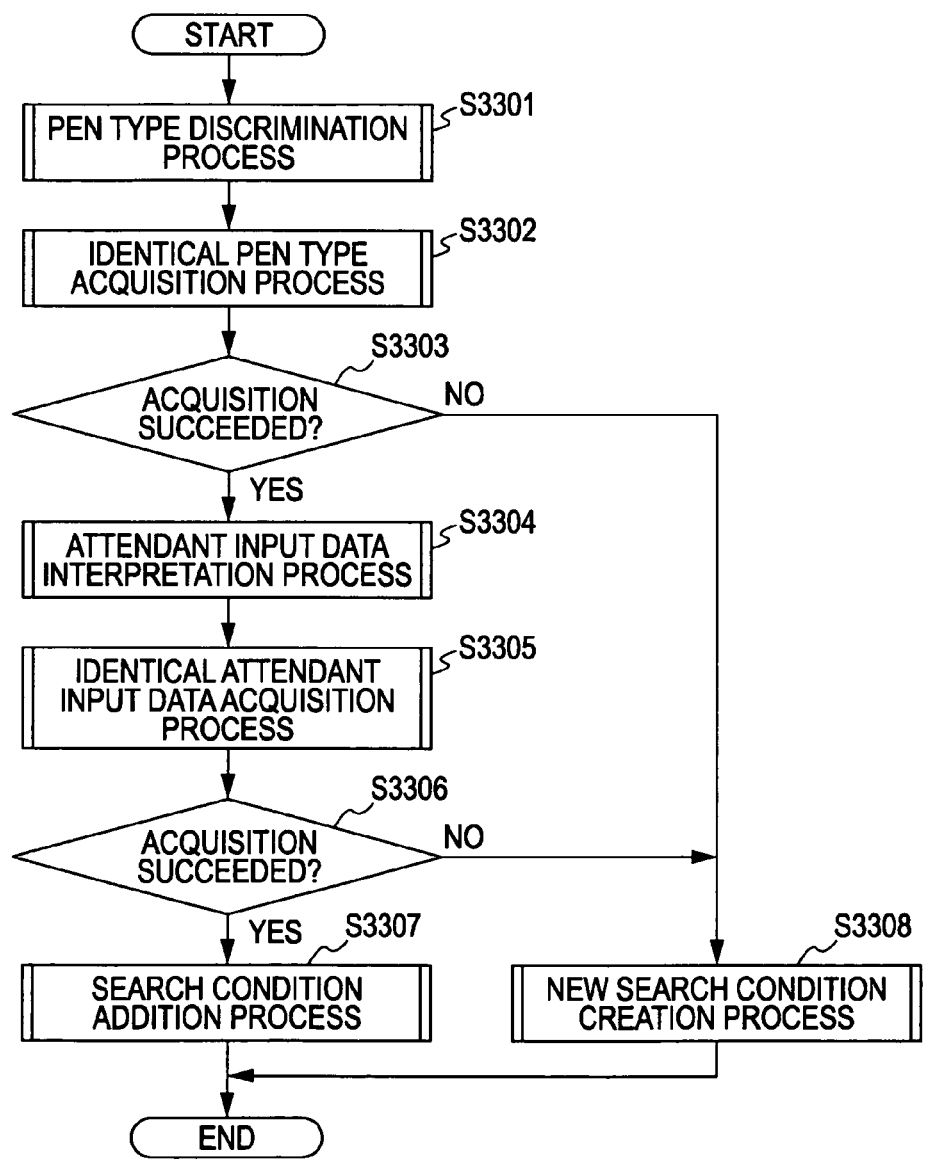
FIG. 33 is a flow diagram showing an exemplary handwriting search command discrimination process.

FIG. 33 is a flow diagram showing an exemplary handwriting search command determination process performed by the handwriting search command discrimination unit 303 according to this embodiment. In a pen type determination process in S3301, a pen type with which the handwriting search commands have been input is discriminated. In S3302, in an identical pen type acquisition process, the search condition including the search key corresponding to the handwriting search command that has been input with the a pen type identical to the above-mentioned pen type is acquired. As a result, when it is not determined in S3303 that the acquisition is success, a search condition having the search key corresponding to the handwriting search commands is newly created in a new search condition creation process in S3308 to end the process.

On the other hand, when it is determined in S3303 that the acquisition is success, attendant data that has been input following the handwriting search commands is interpreted in an attendant input data interpretation process in Step S3304. In sequence, the search condition having the search key corresponding to the handwriting search command in which attendant data identical to the above-mentioned attendant data has been input is acquired in an identical attendant input data acquisition process in S3305. As a result, when it is determined in S3306 that the acquisition is success, the search key corresponding to the handwriting search commands is added in the search condition in S3307. On the other hand, when it is not determined in S3306 that the acquisition is success, a search condition having a handwriting search command corresponding to the search key is newly created to end the process in a new search condition creation process in S3308.

As described above, according to this embodiment, different search instructions can be issued by drawing the handwriting search commands in a different manner, whereby the convenience is improved. In addition, different search instructions can be issued by switching the pen types for the handwriting search commands. Furthermore, different search instructions can be issued by adding attendant data to the handwriting search commands.

Fourth Exemplary Embodiment

In a fourth embodiment, with reference to FIGS. 34 and 35, a description will be given of an example where a search key identification rule is specified.

Figure 34:
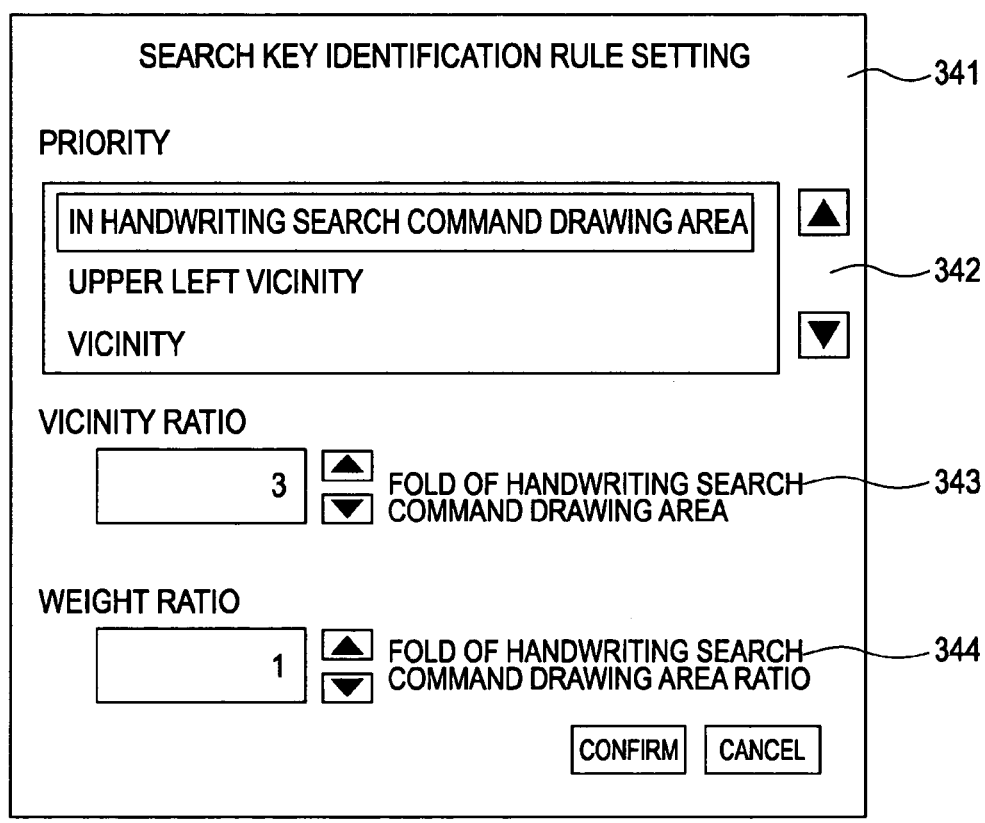
FIG. 34 shows an example of a search key identification rule specification screen.

FIG. 34 shows an example of a search key identification rule specification screen 341 according to this embodiment. In this drawing, the state is shown where a search key identification priority order 342, a vicinity ratio 343 indicating a vicinity area range, a weight ratio 344 indicating a search key weighting ratio can be specified. For example, in this drawing, "the handwriting search command inner drawing area", "upper left vicinity", and "vicinity" are specified in the stated priority order, where the vicinity ratio is set as "3" fold of the handwriting command drawing area and the weight ratio is set as "1" fold of the handwriting command drawing area ratio.

Figure 35:
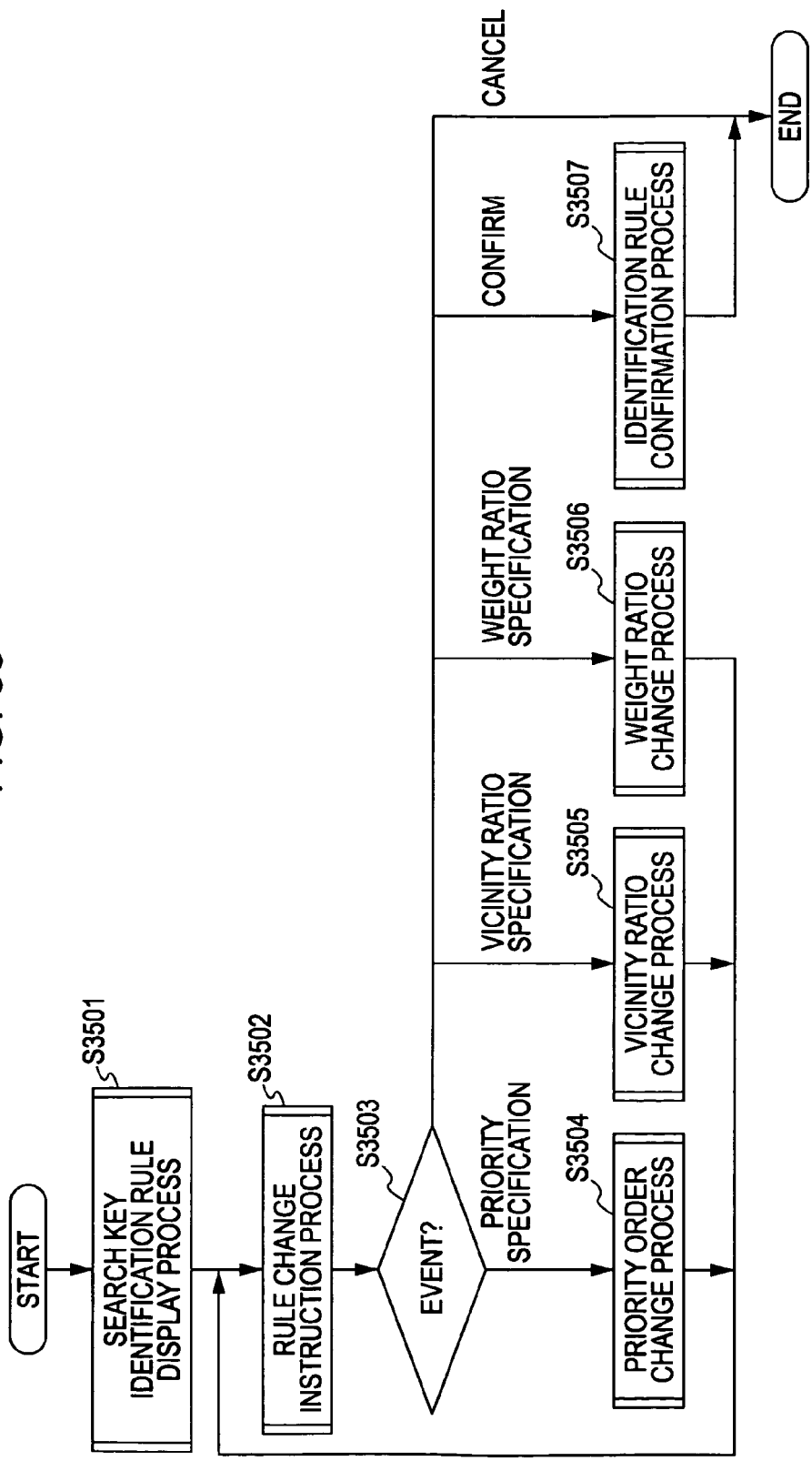
FIG. 35 is a flow diagram showing an exemplary search key identification rule specification process.

FIG. 35 is a flow diagram showing an exemplary search key identification rule specification process performed by the search key identification rule specification unit 308 according to this embodiment. The current rule is displayed as shown in FIG. 34 in a search key identification rule display process in S3501. In sequence, a change instruction by a user is received in a rule change instruction process in S3502. When it is determined in S3503 that the instruction is for a priority order specification operation, the priority order is changed in a priority order change operation in S3504. Then, the flow returns to S3502 again to repeatedly execute the processes.

When it is determined in S3503 that the instruction is for a vicinity ratio specification operation, the vicinity ratio is changed in S3505 in a vicinity ratio change operation, and the flow returns to S3502 again to repeatedly execute the processes. When it is determined in S3503 that the instruction is for a weight ratio specification operation, the weight ratio is changed in a weight ratio change operation in S3506, the flow returns to S3502 again to repeatedly execute the processes. When it is determined in S3503 that the instruction is for a confirmation operation, the change content that has been made up to now is confirmed in an identification rule confirmation process in S3507 to thereby end the process. When it is determined in S3503 that the instruction is for a cancellation operation, the change content that has been made up to now is ignored to end the process.

As described above, the search key identification rule can be specified by the user, whereby the convenience is improved.

Fifth Exemplary Embodiment

In a fifth embodiment, with reference to FIGS. 36 to 40, a description will be given of an example where an input command is not properly recognized as the handwriting search command, the handwriting search command is selected and instructed from a recognition candidate list to perform search. Also, a description will be given of an example where the search is terminated when an input command is misrecognized as the handwriting search command on the contrary.

Figure 36:
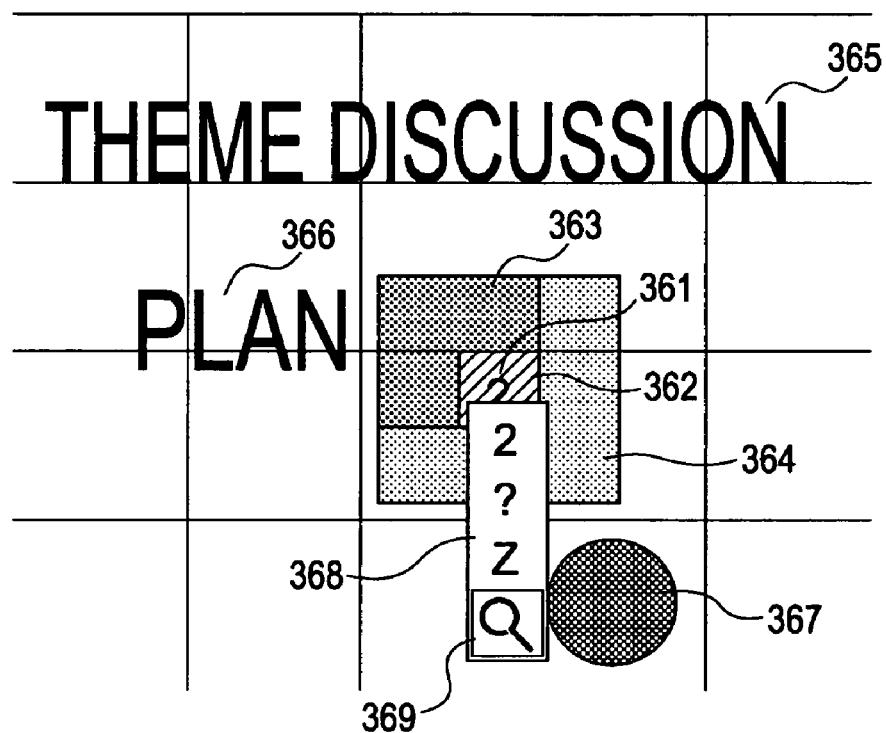
FIG. 36 shows an example of a recognition candidate display screen.

FIG. 36 shows examples of a search key identification area, a recognition result character, and a misrecognition correction operation according to this embodiment. In this drawing, character string objects "theme discussion" 365 and "plan" 366, and a graphic object 367 are displayed. Then, the state is shown where a character string object 361 is input in the vicinity of a character string object 366. Also, areas are shown including the handwriting search command inner drawing area 362, an upper left vicinity 363, and a vicinity 364 corresponding to the above-mentioned search key identification rule. It is understood that the respective objects 365, 366, and 367 and the handwriting search command inner drawing area 362, the upper left vicinity 363, and the vicinity 364 are not mutually overlapped in any area. The state is shown where it is not determined that the identification is not success in the handwriting input interpretation process in S405 described in FIG. 4, and the input data is recognized as a character string in the handwriting character recognition process in S407. This is because in spite of inputting the handwriting search command, there is no object in the area where the object could be identified as the search key. In this drawing, the state is further shown where in order to correct the character string object that has been misrecognized, a recognition candidate list 368 is displayed, and from the list a handwriting search command 369 is selected.

Figure 37:
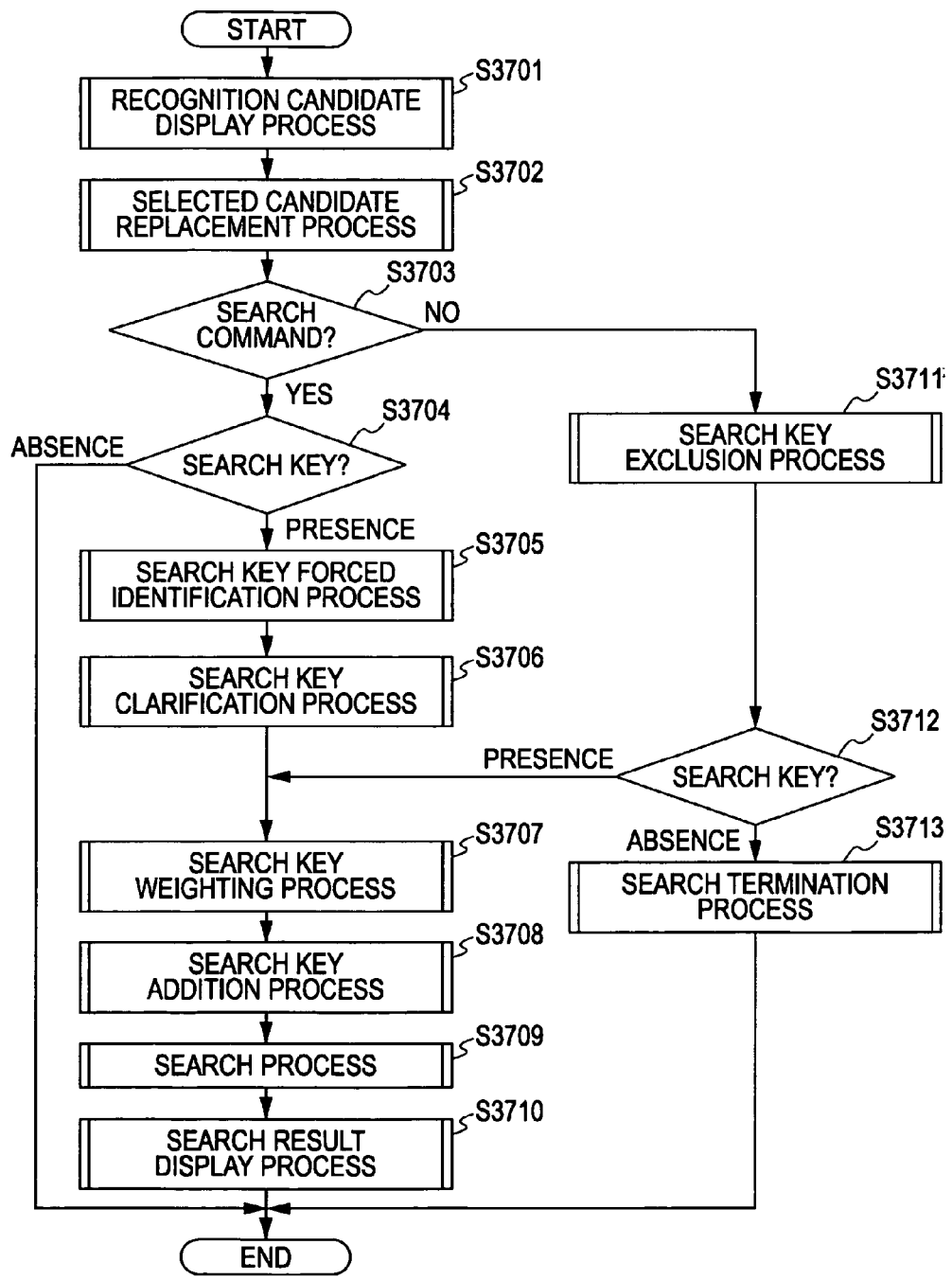
FIG. 37 is a flow diagram showing an exemplary recognition candidate change process.

FIG. 37 is a flow diagram showing an exemplary recognition candidate change process performed by the recognition candidate change unit C according to this embodiment. Recognition candidates of the target specified by the user are displayed in a recognition candidate display process in S3701 and a selection operation is received. In sequence, replacement with the selected candidate is performed in a selection candidate replacement process in S3702, and then it is determined in S3703 whether or not the selected candidate is a search command.

When it is determined in S3703 that the search command is selected, it is determined in S3704 whether or not a search key exists. When it is determined that no search key exists, the process ends. On the other hand, when it is determined in S3704 that the search key exists in the display data, a search key forcedly identified beyond a normal vicinity threshold in a search key forced identification process in S3705. In sequence, the identified search key is clarified in a search key clarification process in S3706, and when necessary, the search key change is received. The weighting on each search key is determined in a search key weighting process in S3707, and then the search key is added to the search condition in a search key addition process in S3708. In sequence, a search is performed in a search process in S3709, and the search result is displayed in S3710 in a search result display process to thereby end the process.

On the other hand when it is not determined in S3703 that the search command is selected, the search key corresponding to the target command is excluded from the search condition in S3711 in a search key exclusion process. As a result, when it is determined in S3712 that the search key exists in the search condition, the flow proceeds to S3707, and when it is determined in S3712 that no search key exists in the search condition, the search is terminated in a search termination process in Step S3713 to end the process.

Figure 38:
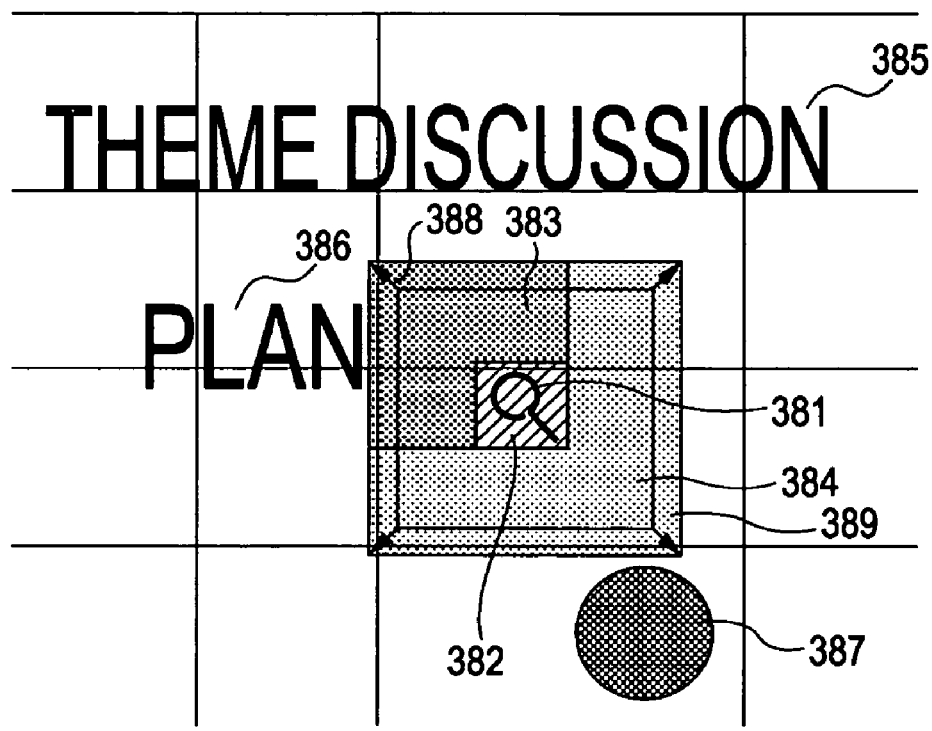
FIG. 38 shows an example of search key identification range expansion.

FIG. 38 shows an example of expanding the search key identification area as the result of a misrecognition correction operation according to this embodiment. In this drawing, character string objects "theme discussion" 385 and "plan" 386, and a graphic object 387 are displayed. Furthermore, the state is shown where a misrecognition result is subjected to a correction operation in a search command 381 in the vicinity of a character string object. Also, areas are shown including a handwriting search command inner drawing area 382, an upper left vicinity 383, and a vicinity 384 corresponding to the above-mentioned search key identification rule. The respective objects 385, 386, and 387 and a handwriting search command inner drawing area 382, the upper left vicinity 383, and the vicinity 384 are not manually overlapped at any area. Furthermore, in this drawing, the state is shown where as the handwriting search command is subjected to the correction operation, in order to forcedly identify the search key, a vicinity threshold range is expanded to cover an upper left vicinity 388 and a vicinity 389 as well. As a result, the state is shown where the character string object 386 and the upper left vicinity 388 are overlapped with each other.

Figure 39:
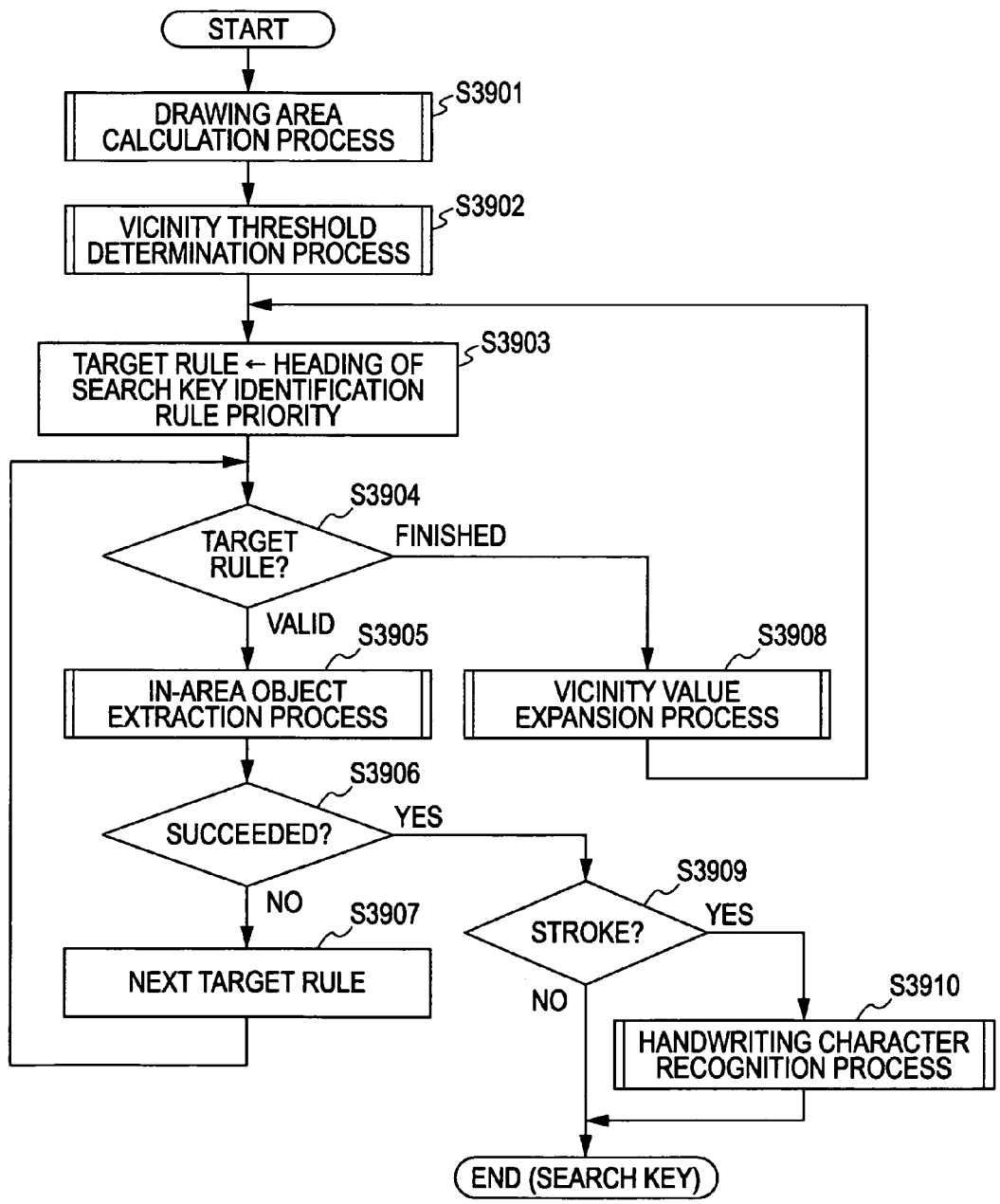
FIG. 39 is a flow diagram showing an exemplary search key forced identification process.

FIG. 39 is a flow diagram showing an exemplary search key forced identification process performed by the search key forced identification unit 328 according to this embodiment. A handwriting search command drawing area in a drawing area calculation process in S3901 is calculated. In sequence, a vicinity threshold to be used in the following processes is determined on the basis of the value of the handwriting search command drawing area in a vicinity threshold determination process in S3902. Then, in S3903, the process target rule is reset to the heading of the priority order defined under the search key identification rule, and the processes in S3904 and subsequent steps are repeatedly executed.

When it is determined in S3904 that the target rule is valid, overlapping objects in the identified target area determined by the vicinity threshold are extracted in an in-area object extraction process in Step S3905. After that, when the extraction is determined to be success in S3906, it is determined whether or not the extracted objects are the handwriting strokes in S3909. In the case of the handwriting strokes, a result of character recognition in a handwriting character recognition process in S3910 is treated as the search key to end the process. When the extraction is not determined to be success in S3906, the target rule is carried forward in S3907, and the flow returns to S3904 again to repeatedly execute the processes. In S3904, the target rules are finished. The vicinity threshold is expanded by a certain value in S3908 in a vicinity threshold expansion process, and the flow returns to S3903 again to repeatedly execute the processes.

Figure 40:
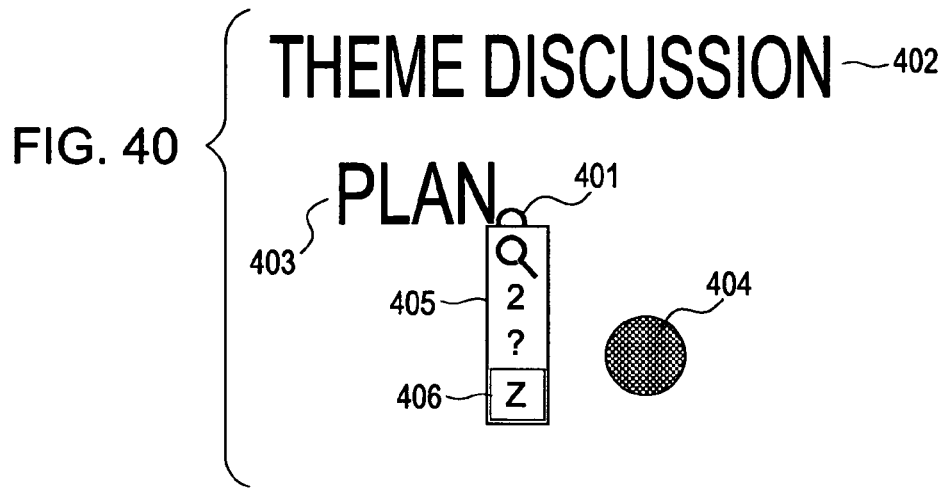
FIG. 40 shows another example of the recognition candidate display screen.

FIG. 40 shows an example where the misrecognition correction operation is performed with the misrecognized handwriting search command treated as a character string according to this embodiment. In this drawing, character string objects "theme discussion" 402 and "plan" 403, and a graphic object 404 are displayed. Then, in the vicinity of a character string object 403, the state is shown where a handwriting search command 401 is input. In this drawing, furthermore, the state is shown where in order to correct the misrecognized handwriting search command, a recognition candidate list 405 is displayed so that a character "z" 406 is selected from the recognition candidate list.

As described above, even when erroneously the command is not recognized as the handwriting search command, the data can be easily specified to the handwriting search command properly, whereby the operability is improved. In addition, even when erroneously the data is recognized as the handwriting search command, the data can be easily specified to the character properly and in association with the event the search can be terminated. Furthermore, even when erroneously the data is recognized as the handwriting search command, the data can be easily specified to the character properly and in association with the event an arbitrary search key can be deleted from the combination of the respective search keys.

Sixth Exemplary Embodiment

According to a sixth embodiment, with reference to FIGS. 41 to 43, a description will be given of an example where a search result display destination is specified by the handwriting strokes which is following the handwriting search command.

Figure 41:
FIG. 41 shows an example of handwriting display destination specification.

FIG. 41 shows an example where the search instruction operation in which handwriting strokes 411 are treated as the search keys and the search result display destination specification are performed at the same time according to this embodiment. Then, display destination specification 413 in the right hand side direction is made for a search command 412.

Figure 42:
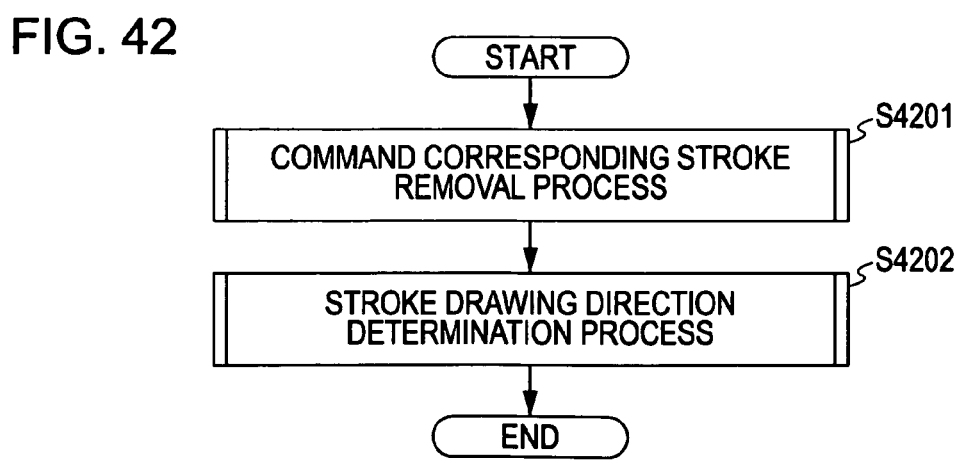
FIG. 42 is a flow diagram showing an exemplary handwriting display destination specification command interpretation process.

FIG. 42 is a flow diagram showing an exemplary handwriting display destination specification command interpretation process according to this embodiment. In Step S4201 of this drawing, in a command corresponding stroke removal process, only a display destination specification stroke part is left, and then in Step S4202, in a stroke drawing direction determination process, a direction of the display destination specification stroke part is determined.

Figure 43:
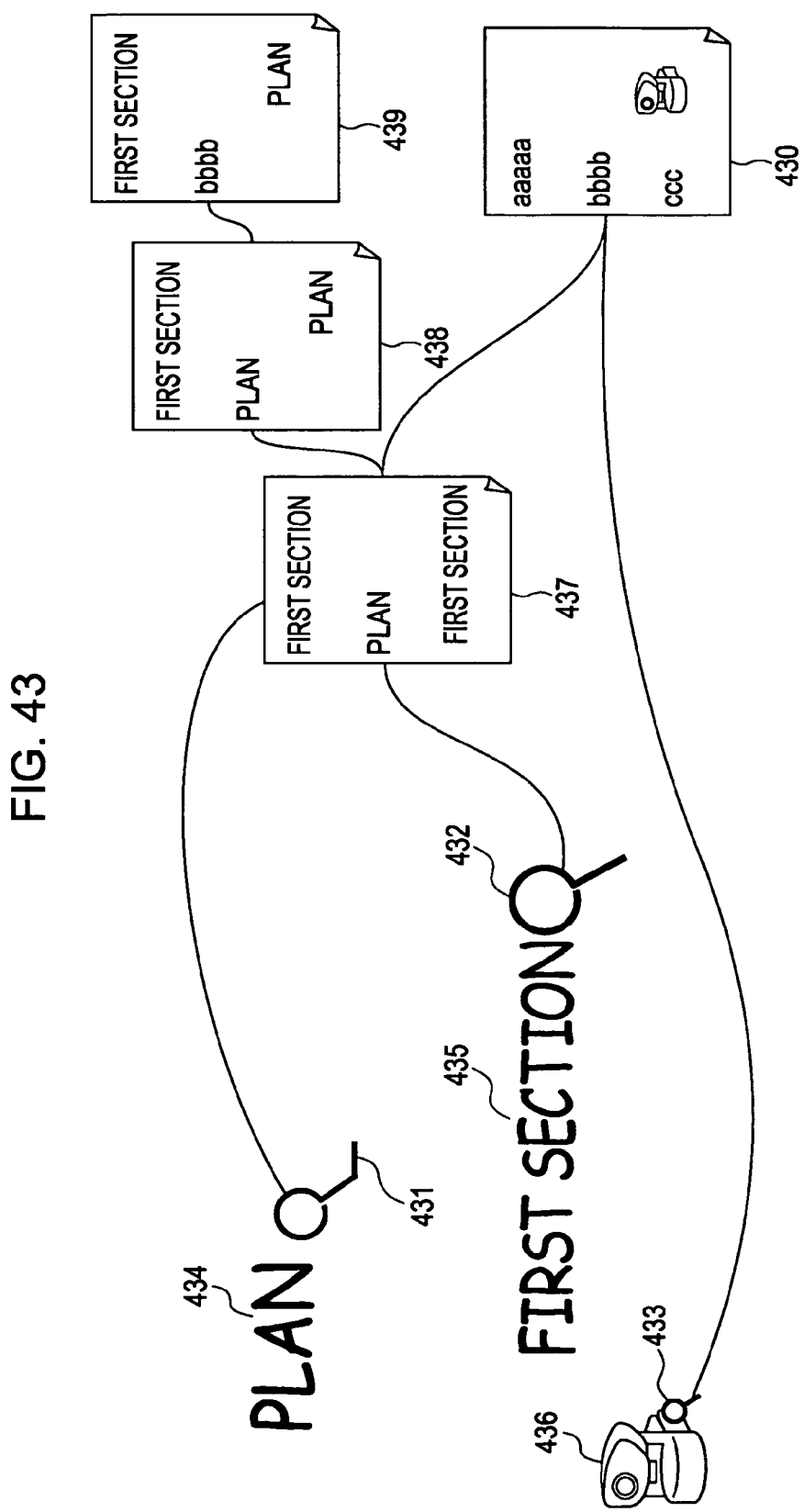
FIG. 43 shows an example where search results are displayed on a specified display destination.

FIG. 43 shows an example where search results are displayed on the specified display destination in this embodiment. In this drawing, in the vicinity of handwriting stroke objects 434 and 435, and an image object 436, handwriting search commands 431, 432, and 433 are input in the form of handwriting. Also, display destination specification is made following the handwriting search command 431, and displayed in the right hand side direction where search results 437, 438, 439, and 430 are specified.

As described above, the display destination of the command execution result can be specified by a handwriting input operation following the handwriting search command, whereby the convenience is improved.

Seventh Exemplary Embodiment

In a seventh embodiment, with reference to FIGS. 44 to 47, a description will be given only of a featuring different point in the example where a handwriting point instruction command input in the vicinity of displayed data is interpreted to identify a point for preparing minutes.

Figure 44:
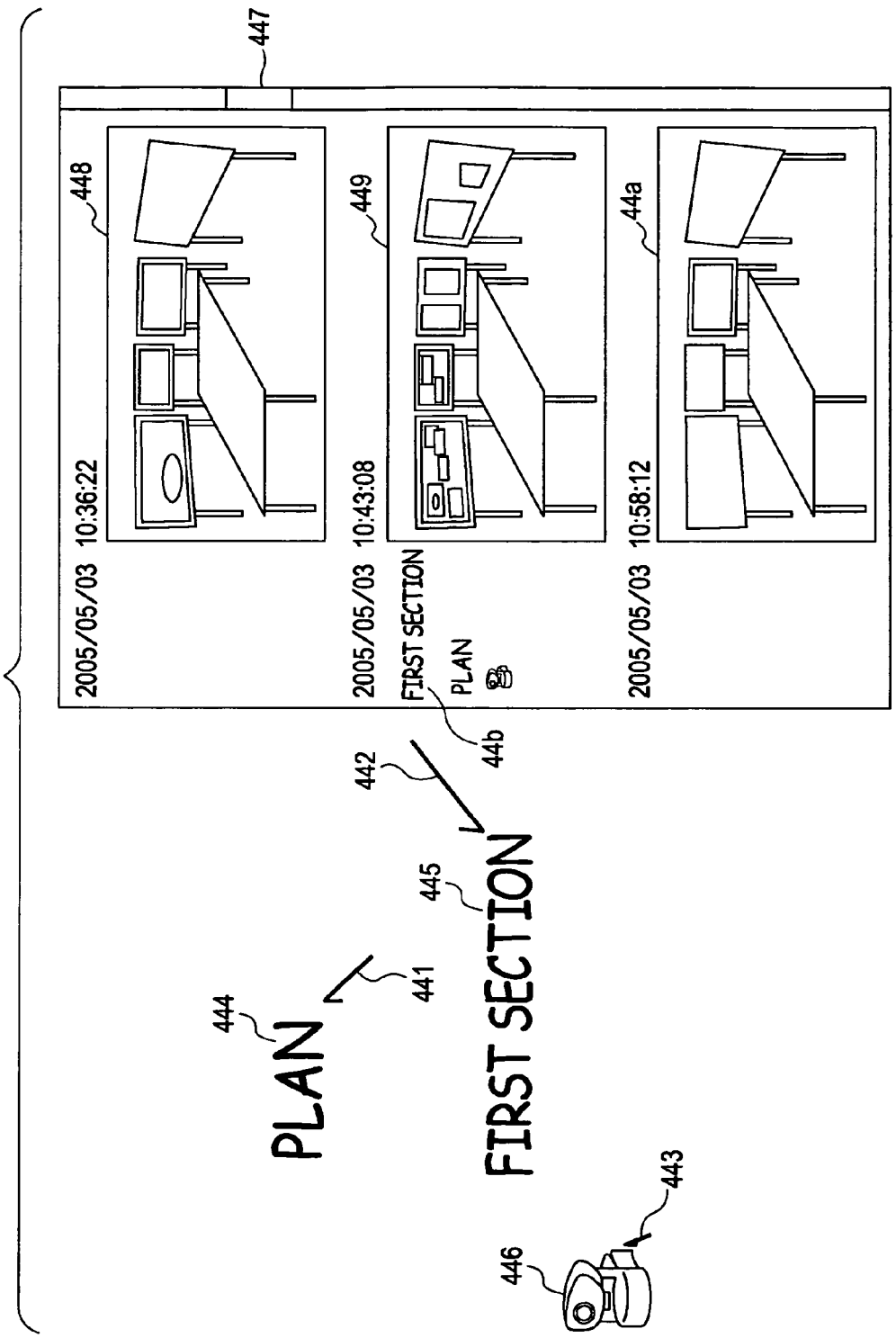
FIG. 44 shows an exemplary minutes preparation operational image.

FIG. 44 shows an example of a minutes preparation operational image with use of this embodiment. Drawing objects including handwriting strokes 444 and 445 and an image 446 are displayed on a display screen in this drawing. Minutes 448, 449, and 44*a* prepared by instructions of handwriting point instruction commands 441, 442, and 443 are displayed in the time sequence, and operations can be realized by a scroll bar 447. It should be noted that in this drawing, the state is shown where, a point 44*b* with the corresponding size and order is described in the minutes in accordance with the handwriting point instruction commands.

FIG. 45 shows an example of handwriting command data base for storing list information of handwriting commands 451 through 455 including handwriting point instruction commands referred to by handwriting command interpretation unit. In the respective handwriting commands, the stroke data and the command type for determining the coincidence with the input stroke, and the possibility as to whether or not further the display destination specification operation is involves are specified. For example, in a handwriting command 451, other than the stroke data, definition of specification of a "delete" command and the absence of display destination specification is made. In a handwriting command 452, other than the stroke data, specification of a "search"

command and definition of the presence of display destination specification is made. In handwriting commands 454 and 455, other than the stroke data, definition of specifications of "upper left point" and "lower left point" commands and the absence of display destination specification are made.

Figures 46, 47:
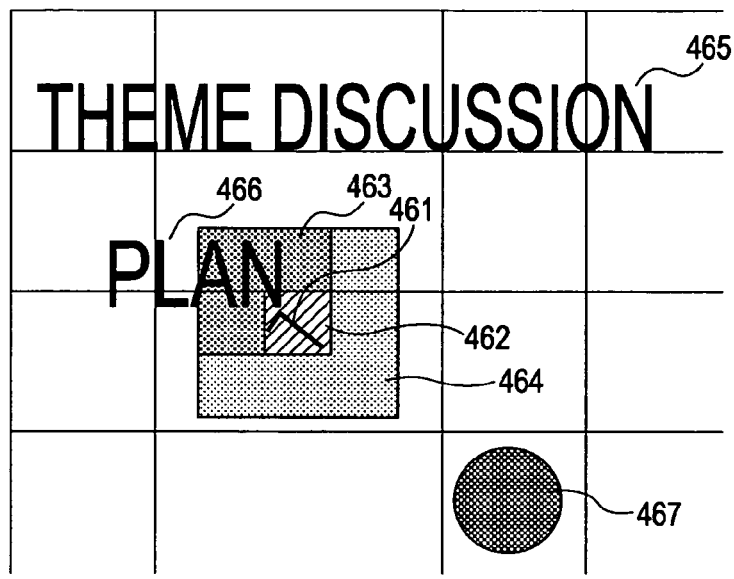
FIG. 46 shows an example of a point identification area.
FIG. 47 shows an exemplary point identification rule.

FIG. 46 shows an example of a point identification area handwriting display destination specification command interpretation process. In this drawing, character string objects "theme discussion" 465 and "plan" 466, and a graphic object 467 are displayed. Then, in the vicinity of a character string object 466, the state is shown where a handwriting point instruction command 461 is input in the form of handwriting. Areas including a handwriting command inner drawing area 462 corresponding to the above-mentioned process target identification rule, an arrow direction vicinity 463, and a vicinity 464 are shown, and the state where the areas including the character string object 466, the handwriting command inner drawing area 462, and the arrow direction vicinity 463 are overlapped one another.

FIG. 47 shows an example of a point identification rule that is referred to by handwriting command process target identification unit. Here, for example, there is a priority item 471, vicinity ratio 472, and a weight ratio 473. In this drawing, according to a priority 471, the priority order of (1) the handwriting command inner drawing area and (2) the arrow direction vicinity is defined. The vicinity ratio 472 is defined as 3 fold of the handwriting command drawing area and the weight ratio 473 is defined as 1 fold of the handwriting command drawing area ratio.

By adding the characteristic difference to the embodiment using the above-mentioned handwriting search command, it is possible to realize a point specification to produce minutes with the handwriting operation, and at the same time the size of the handwriting point instruction command can specify the importance of the point. To be specific, after the process target is identified in accordance with the definition of the point identification rule by interpreting the handwriting point instruction command shown in the handwriting command database, the minutes having the clarified point with consideration of the importance of the process target can be produced.

As described above, the minutes can be produced as the point is identified without the range specification, whereby the convenience is improved. Also, the command target can be identified and executed in accordance with the rule with the priority without the range specification. Furthermore, the identification range of the command target can be specified on the basis of the size of the handwriting command. Then, targets of a plurality of handwriting commands can be identified without the range specification, thereby making it possible to produce the minutes by using the respective process targets in combination. Moreover, the weighting on the respective process targets can be specified on the basis of the size of the handwriting commands.

Eighth Exemplary Embodiment

According to an eighth embodiment, with reference to FIGS. 48 to 64, a description will be given of an example where handwriting command written on a scan original is interpreted to assign attribute to data located at a corresponding position. Also, a description will be given of an example where the size of the handwriting command weights the attribute for sorting. In addition, a description will be given of an example where processes including display and transmission of data to which an attribute has been assigned are instructed by using a control panel of a scanner.

Figure 48:
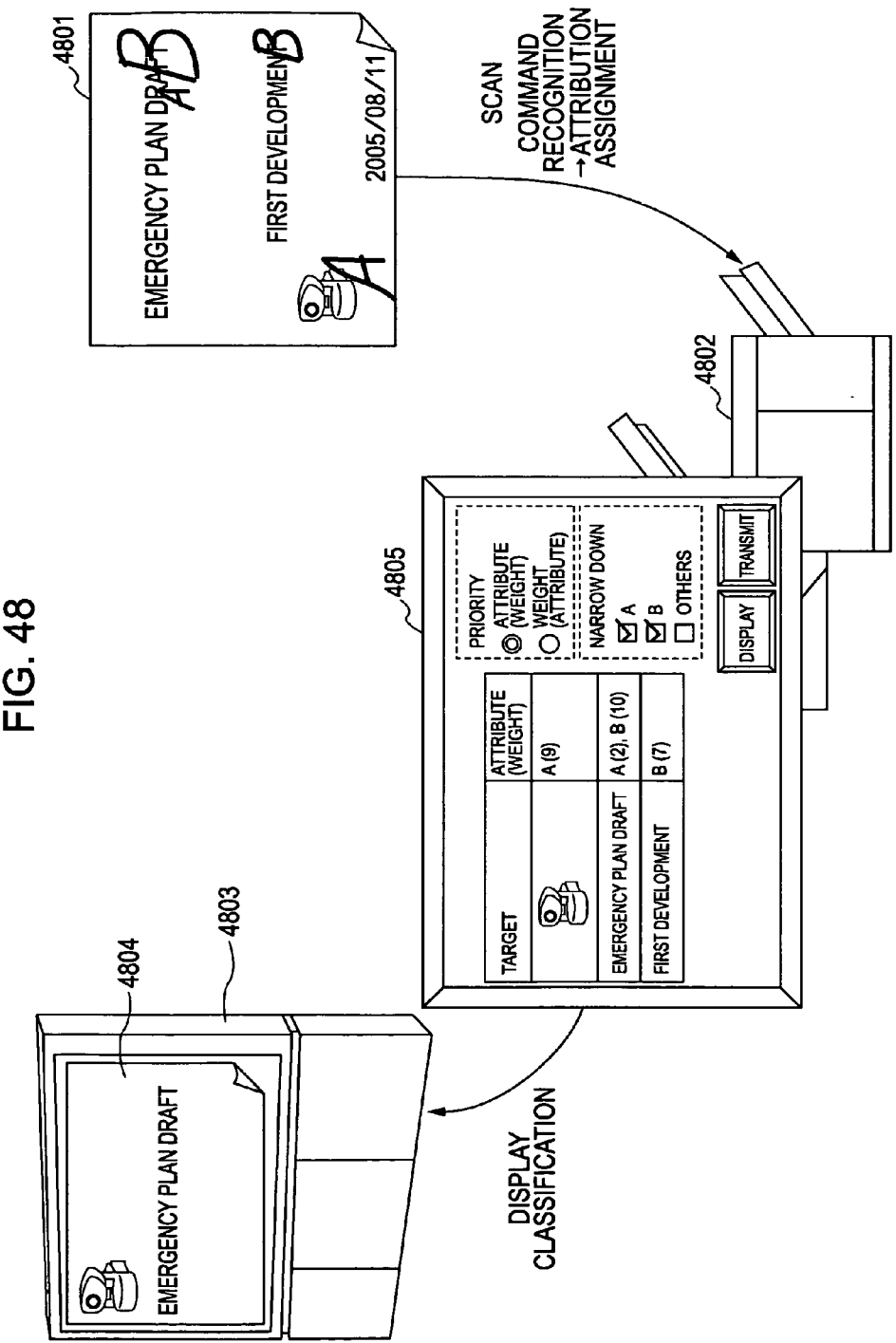
FIG. 48 shows an example of an information processing device image according to an eighth embodiment of the present invention.

FIG. 48 shows an example of an information processing device image according to this embodiment. In this drawing, the state is shown where an original 4801 is scanned by a scanner 4802 and display 4804 of the original is performed on a display 4803. Also, the state is shown where the display instruction to the display is operated by using a control panel 4805 attached to the scanner.

Figure 49:
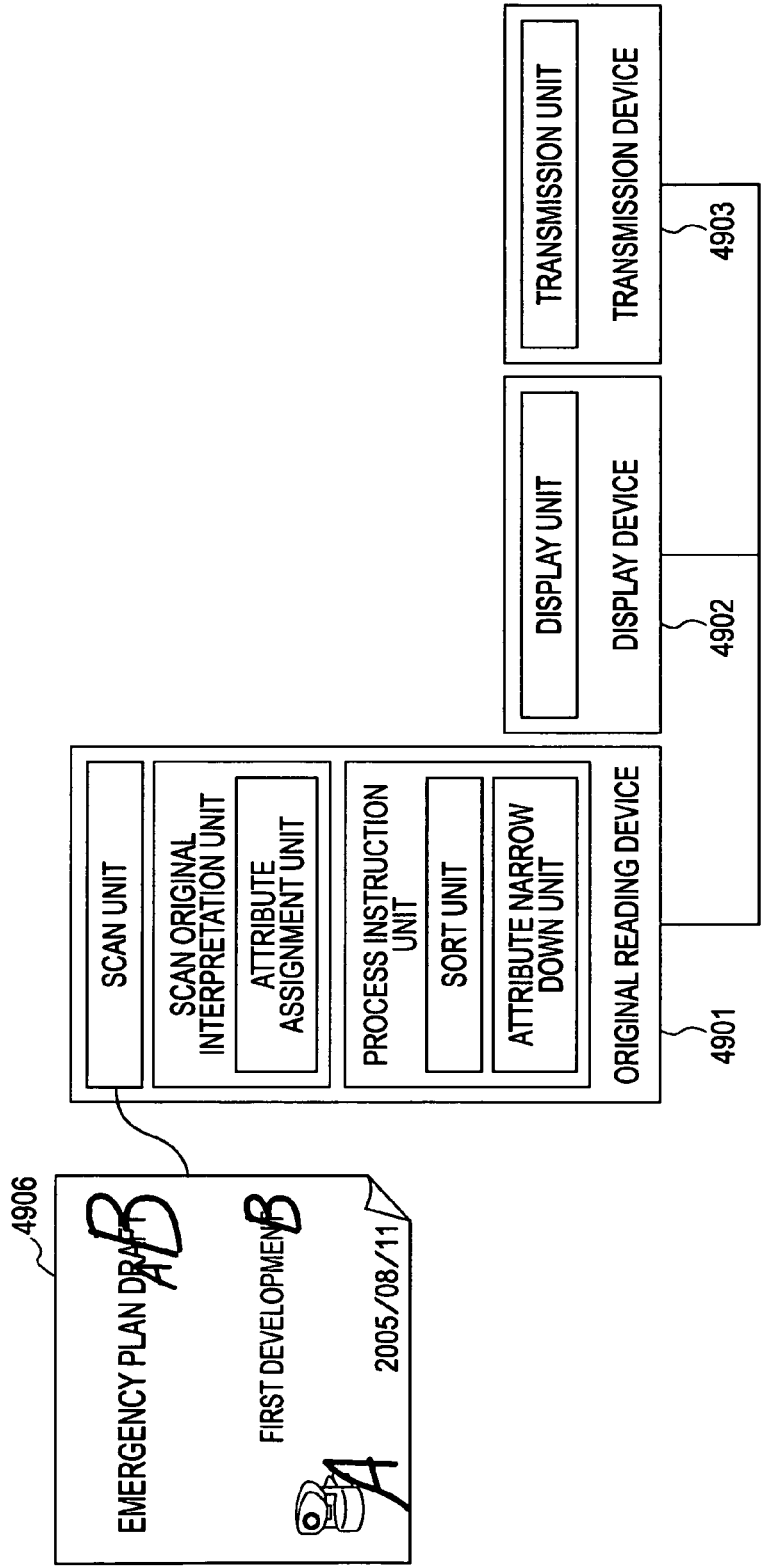
FIG. 49 is an exemplary block diagram according to the eighth embodiment.

FIG. 49 is a block diagram of an exemplary information processing device according to this embodiment. An original 4906 shown in this drawing is scanned by a scan unit of an original reading device 4901, and scan original interpretation unit and attribute assignment unit assigns an attribute to a process target in the original. After that, process instruction unit, sort unit, attribute narrow down unit perform a process instruction the attribute assigned process target. On the other hand, the transmitted process target is displayed on a display device 4902, and the operation by the user is received. A transmission device 4903 transmits the transmitted process target.

Figure 50:
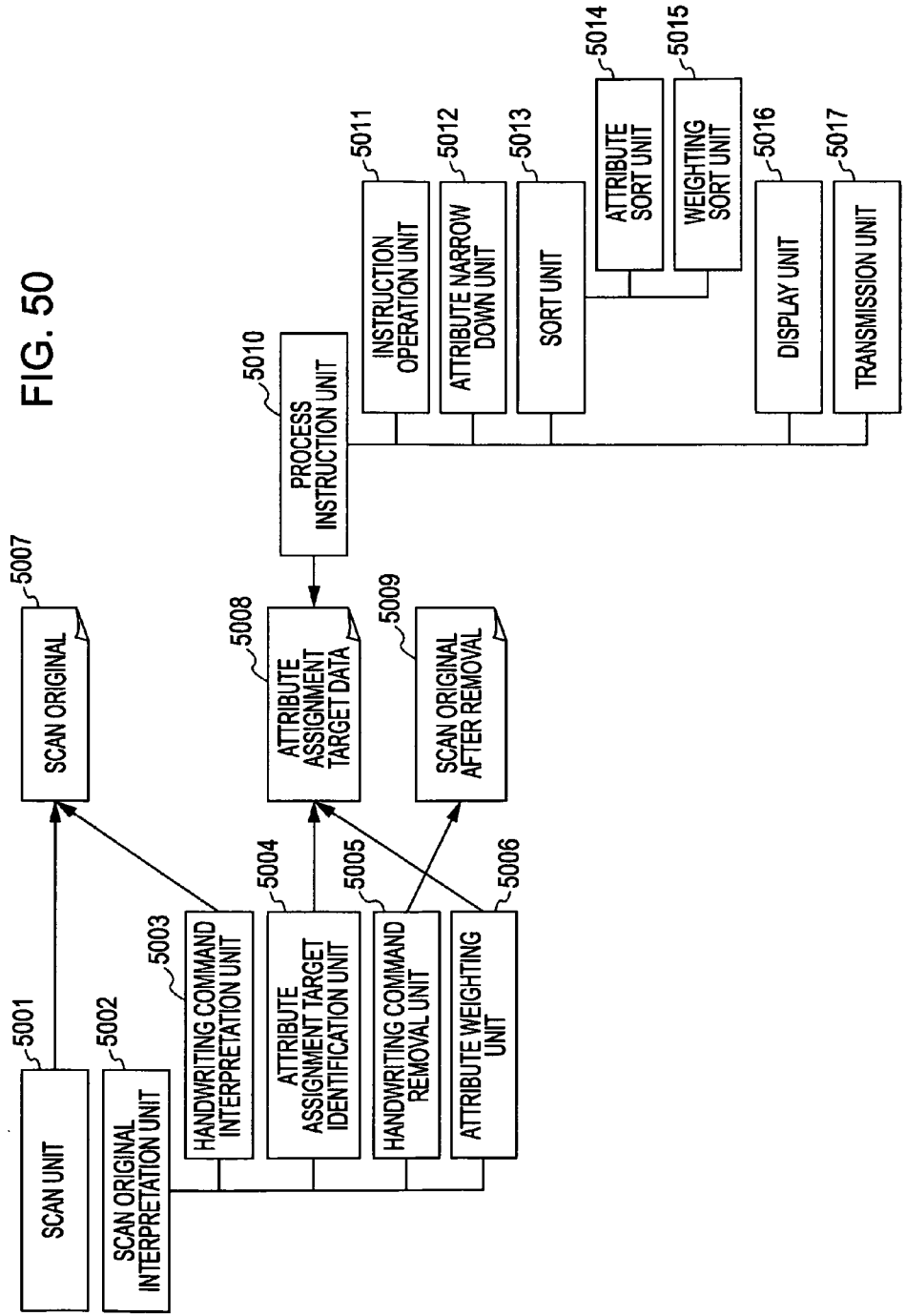
FIG. 50 is an exemplary function block diagram showing including attribute assignment.

FIG. 50 is a function block diagram of an exemplary information processing device according to this embodiment. The respective functions are realized by the program stored in the program memory 4 in collaboration with the CPU 2. Not all the respective functions shown in the drawing are necessarily requisite functions in the embodiment as will be described later, and also functions other than those shown in the drawing may be provided.

As shown in FIG. 50, the information processing device includes scan unit 5001 for scanning a scan original 5007 and scan original interpretation unit 5002 for interpreting the scan original. Then, process instruction unit 5010 instructs a process for the process target in the scan original.

Furthermore, the scan original interpretation unit 5002 includes handwriting command interpretation unit 503 for extracting and interpreting a handwriting attribute assignment command in the scan original. In addition, the scan original interpretation unit 5002 includes attribute assignment target identification unit 5004 for identifying attribute assignment target data 5008 of the handwriting attribute assignment command and handwriting command extraction unit 5005 for performing removal 5009 of the handwriting attribute assignment command from the scan original. Moreover, the scan original interpretation unit 5002 includes attribute weighting unit 5006 for weighting the attribute assignment target data corresponding to the handwriting attribute assignment command size.

On the other hand, process instruction unit 5010 includes instruction operation unit 5011 for receiving the user operation and attribute narrow down unit 5012 for narrowing down attribute assignment target data on the basis of the specified attribute. In addition, the process instruction unit 5010 is composed of sort unit 5013 for sorting the attribute assignment target data under the specified condition, display unit 5016 for displaying the attribute assignment target data, and transmission unit 5017 for transmitting the attribute assignment target data. Furthermore, the sort unit 5013 includes attribute sort unit 5014 and weighting sort unit 5015.

Figures 51, 52:
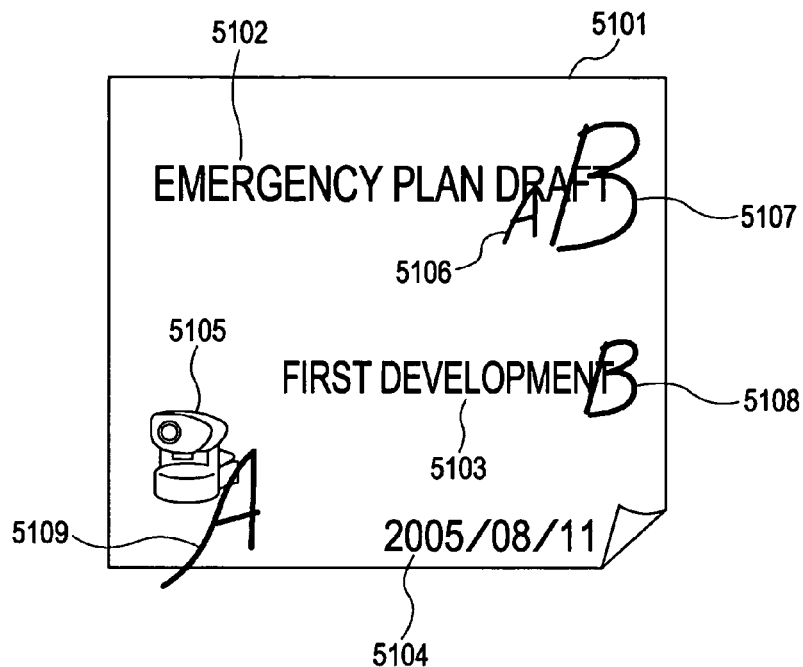
FIG. 51 shows an example of a scan original.
FIG. 52 shows exemplary handwriting attribute data.

FIG. 51 shows an example of an original on which a handwriting attribute assignment command is written, which is a scan target in the eighth embodiment. The state is shown where a scan original 5101 is composed of text areas 5102, 5103, and 5104 and an image area 5105, and furthermore, handwriting attribute assignment commands 5106, 5107, 5108, and 5109 are written on the scan original 5101.

FIG. 52 shows an example of the handwriting attribute data generated in the eighth embodiment. Handwriting attribute data 5201 to 5203 are composed of uniquely identifiable IDs 303 to 305, attribute assignment target data, attributes, and weight values on the attributes. For example, the handwriting attribute data 5201 corresponds to an attribute assignment target "emergency plan draft" to which the handwriting attribute assignment commands 5106 and 5107 are assigned as shown in FIG. 51. Then, it is recorded that the ID is 303, the weight of an attribute "A" is 2, and the weight of an attribute "B" is 10.

Figure 53:
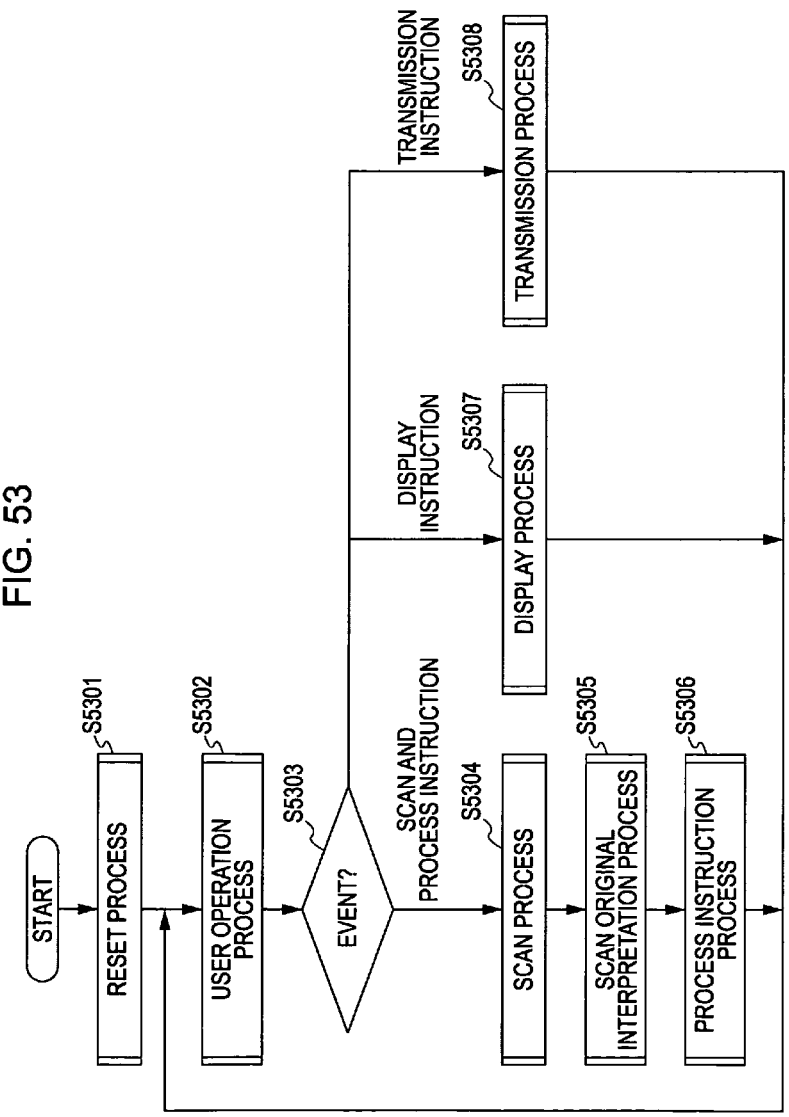
FIG. 53 is a flow diagram showing an exemplary overall process.

FIG. 53 is a flowchart for describing an exemplary overall process of the information processing device according to the eighth embodiment. First of all, in a reset process in Step S5301, a reset operation for displaying an operation screen and the like is conducted. Subsequently, in a user operation process in Step S5302, a user operation is received, and next the flow branches off in Step S5303. When it is determined in Step S5303 that the scan and process instruction has been issued, the original is scanned in a scan process in Step S5304. After that, in a scan original interpretation process in Step S5305, the handwriting attribute assignment command in the scan original is interpreted. Then, in a process instruction process in Step S5306, a process where the attribute assignment target has been specified is instructed, and the flow returns to Step S5302 again to repeatedly execute the processes.

When it is determined in Step S5303 that the display instruction has been issued, the specified attribute assignment target is displayed in display process in Step S5307, and the flow returns to Step S5302 again to repeatedly execute the processes. Alternatively, when it is determined in Step S5303 that the transmission instruction has been issued, the specified attribute assignment target is transmitted in a transmission process in Step S5308, the flow returns to Step S5302 again to repeatedly execute the processes.

Figure 54:
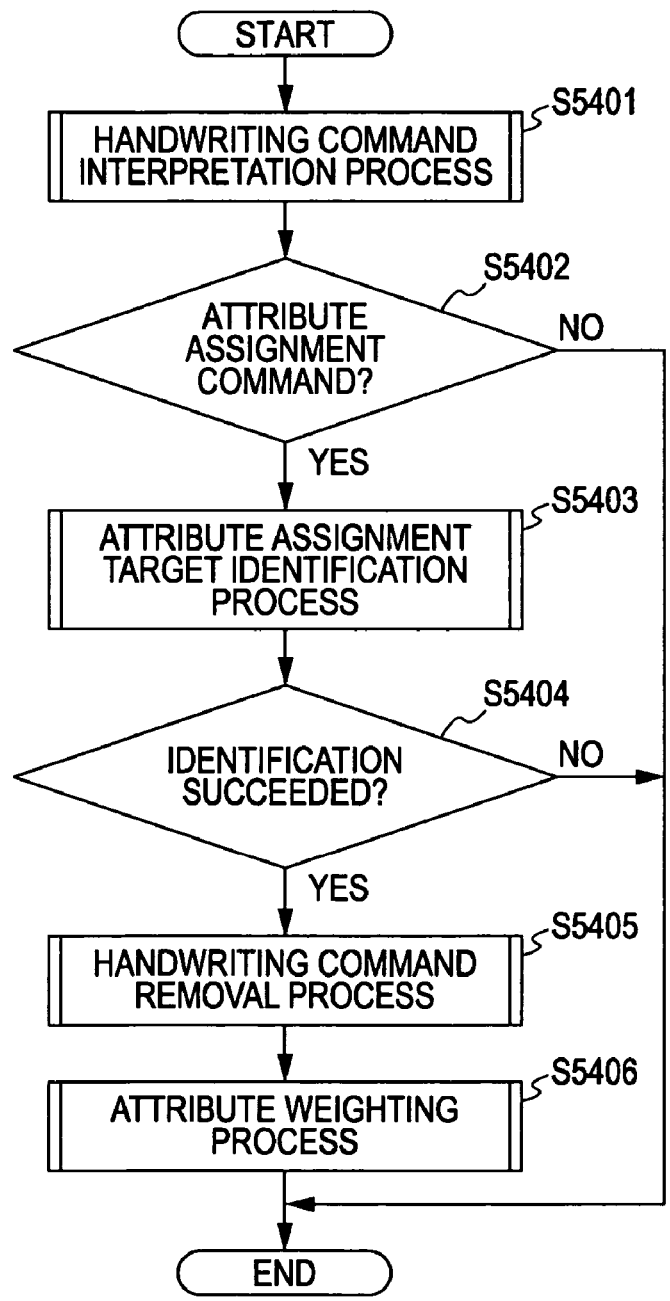
FIG. 54 is a flow diagram showing an exemplary scan original interpretation process.

FIG. 54 is a flow diagram showing an exemplary scan original interpretation process by the scan original interpretation unit 5002 shown in FIG. 50. In a handwriting command interpretation process in Step S5401, the handwriting attribute assignment command written on the original is interpreted, and then in Step S5402 it is determined whether or not the attribute assignment command exists. As a result, when it is determined that the attribute assignment command exists, an instruction target object of the handwriting attribute assignment command is identified in an attribute assignment target identification process in Step S5403, and then in Step S5404 it is determined whether or not the identification has been succeeded. As a result, when it is determined the identification is success, the handwriting attribute assignment command is removed from the scan original in a handwriting command removal process in Step S5405. In sequence, in Step S5406 in an attribute weighting process, the attribute is weighted on the basis of the size of the handwriting attribute assignment commands to end the process. On the other hand, when it is not determined in Step S5402 that the attribute assignment command exists or it is not determined in Step S5404 that the identification is success, the process ends without any event.

Reference numerals 5501 to 5504 in FIG. 55 show examples of handwriting attribute assignment command definition data according to the eighth embodiment. The handwriting attribute assignment command definition data is composed of definition of stroke information and an assigned attribute. For example, in the handwriting attribute assignment command definition data 5501, strokes 516 and 519 written on the scan original of FIG. 51, identical stroke information, and corresponding attribute "A" are defined.

Figure 56:
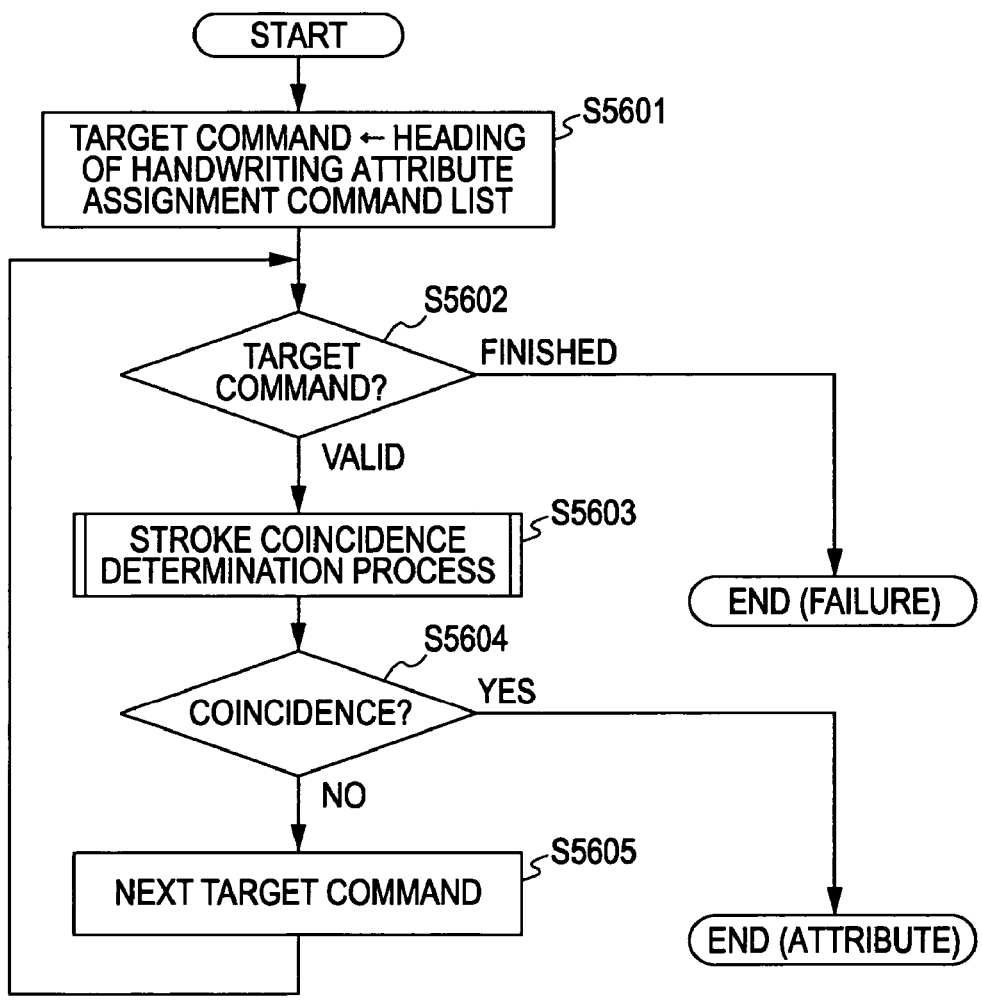
FIG. 56 is a flow diagram showing an exemplary handwriting command interpretation process.

FIG. 56 is a flow diagram showing an exemplary handwriting command interpretation process by the handwriting command interpretation unit 5003 shown in FIG. 50. In FIG. 56, in S5601, the process target command is set to the heading of the handwriting attribute assignment command list for resetting. In S5602, it is determined whether or not the target command is value. When it is determined that the target command is value, the coincidence between the handwriting strokes input and the stroke data of the target command is determined by the operator in a stroke coincidence determination process in S5603. As the result of the determination, when the coincidence is confirmed in S5604, the process is ended while the attribute of the command is taken as a return value. When the coincidence is not confirmed in S5604, the target command is carried forward in S5605, and the process returns to S5602. In S5602, when it is determined in that the target command is invalid, no handwriting attribute assignment command corresponding to the input stroke exists and the process is ended.

Figure 57:
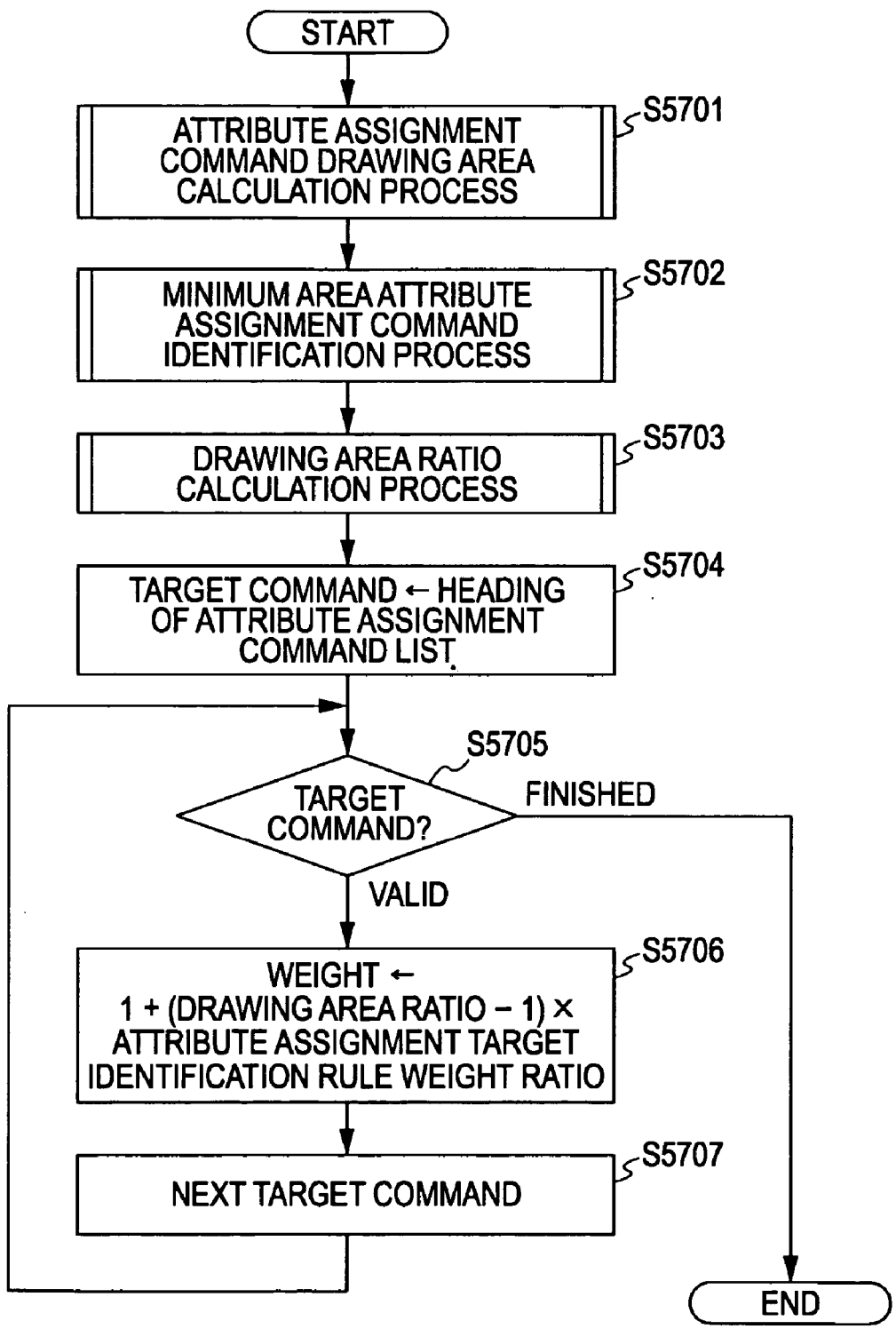
FIG. 57 is a flow diagram showing an exemplary handwriting attribute weighting unit.

FIG. 57 is a flow diagram showing an exemplary handwriting attribute weighting process performed by the attribute weighting unit of FIG. 50. In S5701, the drawing area calculation unit 316 calculates the drawing area size described in FIG. 21 in an attribute assignment command drawing area calculation process. In S5702, in a minimum area attribute assignment command identification process, among the respective attribute assignment commands described in FIG. 21, a command having the minimum drawing area is identified. Subsequently, in S5703 in a drawing area ratio calculation process, the size ratio with respect to the minimum drawing area described in FIG. 21 is calculated.

In S5704, the process target is reset to the heading of the attribute assignment command list, and in S5705 the following processes are repeatedly executed until the target becomes invalid. When the target is determined to be valid in S5705, weighting on a corresponding handwriting attribute is determined as [1+(drawing area ratio−1)×attribute assignment identification rule weight ratio] in Step S5706. In S5707, the target is carried forward, and the flow returns to Step S5705 again to repeatedly execute the processes. It is noted that the attribute assignment identification rule unit that a rule similar to the above-mentioned search key identification rule is defined in terms of the attribute assignment.

Figure 58:
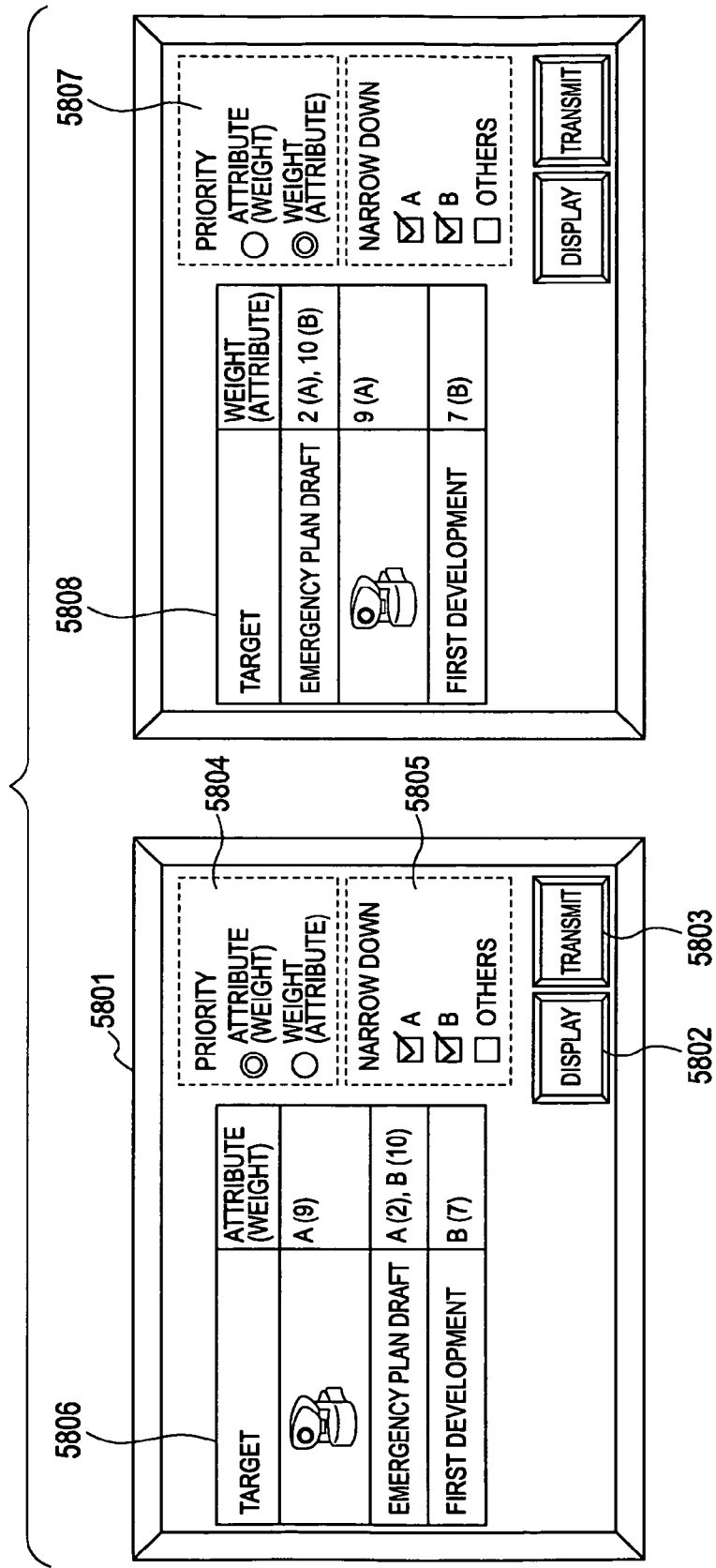
FIG. 58 shows an example of a process instruction screen.

FIG. 58 shows an example of a process instruction screen displayed on the control panel attached to the scanner according to the eighth embodiment. The process instruction screen 5801 is composed of a display instruction button 5802, a transmission instruction button 5803, priority order specification areas 5804 and 5807, a narrow down specification area 5805, and handwriting attribute data lists 5806 and 5808. Also, in this drawing, the state is shown where the handwriting attribute data lists change depending on a difference in a priority order specification. To be specific, as indicated by the priority order specification area 5804, the attribute is set as the first priority and the weighting is set as the second priority, whereby targets with the attribute A gathers at the heading and among the targets, targets with larger weight are arranged in the descending order as shown in the handwriting attribute data list 5806. On the other hand, the state is shown by the priority order specification area 5807 where the weighting is set as the first priority and the attribute is set as the second priority, whereby targets with larger attribute are arranged in the descending order.

Figure 59:
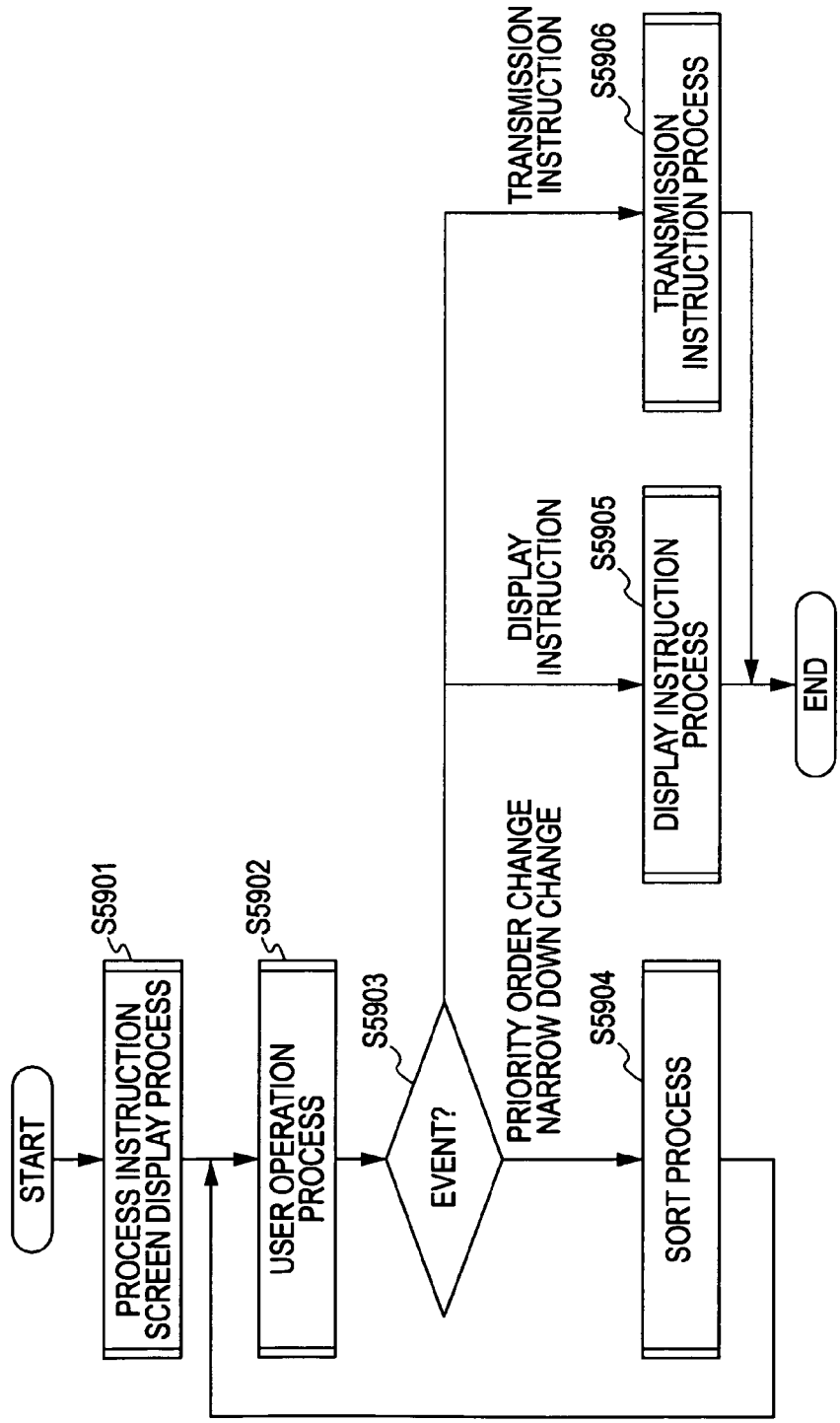
FIG. 59 is a flow diagram showing an exemplary process instruction process.

FIG. 59 is a flow diagram showing an exemplary process instruction process for the information processing device according to the eighth embodiment. First of all, in a process instruction screen display process in Step S5901, the process instruction screen described in FIG. 58 is displayed, and then a user operation is received in a user operation process in Step S5902. Next in Step S5903, the flow blanches off. When it is determined in Step S5903 that the priority order change or narrow down operation has been performed, handwriting attribute data is sorted in a sort process in Step S5904, the flow returns to Step S5902 again to repeatedly execute the processes. When it is determined in Step S5903 that the display instruction has been issued, in a display instruction process in Step S5905, the display instruction operation by the user is received to end the process. Alternatively, it is determined in Step S5903 that the transmission instruction has been issued, in a transmission instruction process in Step S5906, the transmission instruction operation by the user is received to end the process.

Figure 60:
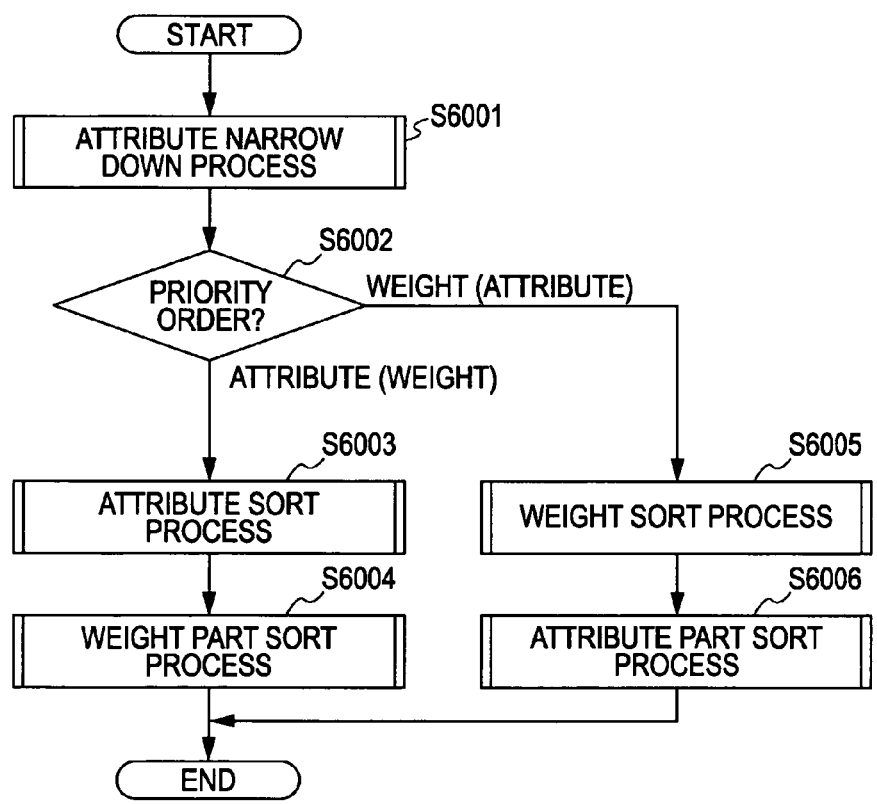
FIG. 60 is a flow diagram showing an exemplary sort process.

FIG. 60 is a flow diagram showing an exemplary sort process by the sort unit 5013 of FIG. 50. First of all, in Step S6001 in an attribute narrow down process, the handwriting attribute data is narrowed down on the basis of the narrow down condition specified in FIG. 58, and then the flow blanches off in Step S6002. When it is determined in Step S6002 that the priority order regards the attribute as high priority, the targets are rearranged in terms of the attribute in an attribute sort process in Step S6003. After that, in a weight part sort process in Step S6004, the targets in the respective attribute sort part are rearranged in terms of the weighting to end the process. On the other hand, when it is determined in Step S6002 that the priority order regards the weighting as high priority, the targets are rearranged in terms of the weighting in a weight sort process Step S6005. Then, in an attribute part sort process in Step S6006, the targets in the respective weighting sort part are rearranged in terms of the attribute to end the process to end the process.

Figure 61:
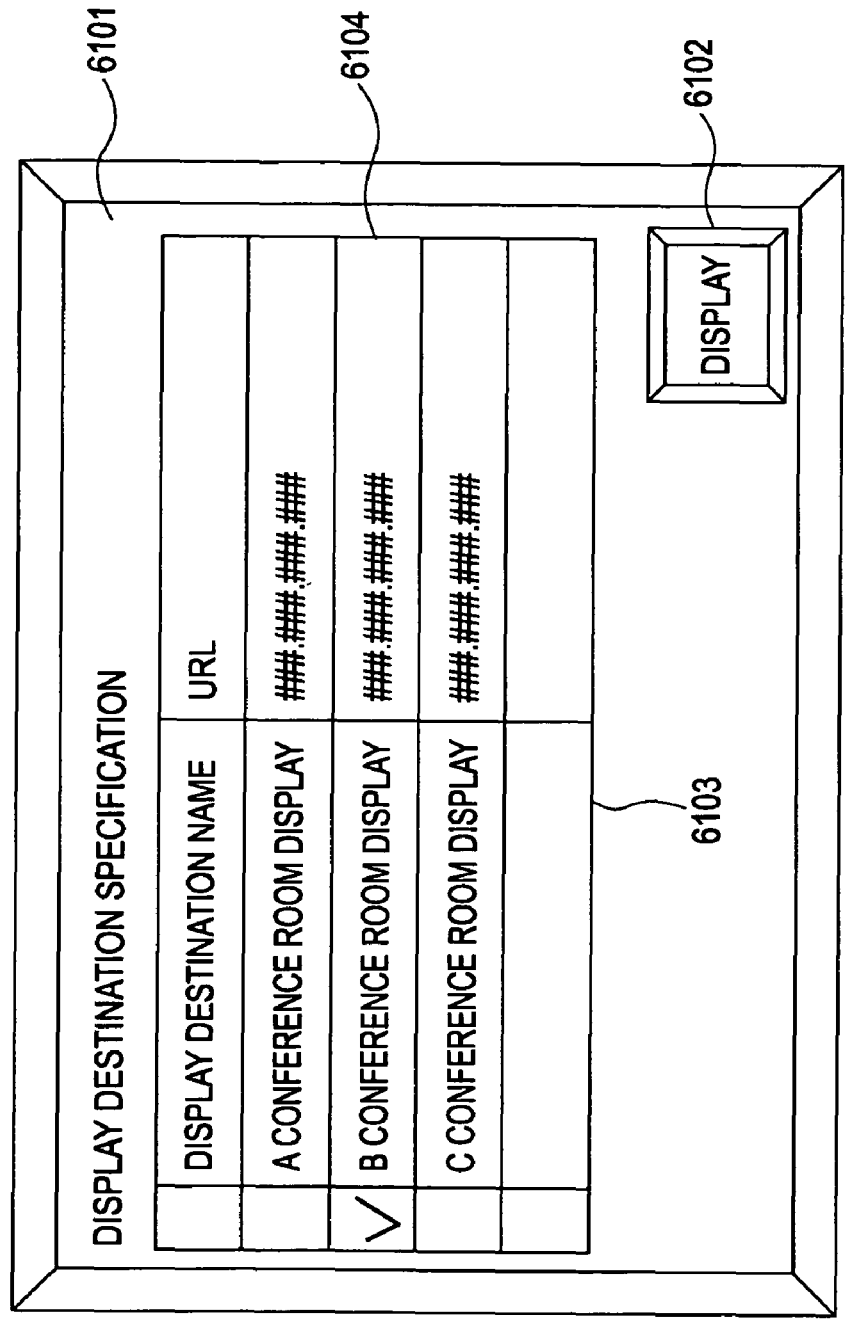
FIG. 61 shows an example of a display instruction screen.

FIG. 61 shows an example of a display instruction screen displayed on the control panel attached to the scanner according to the eighth embodiment. A display instruction screen 6101 is composed of a display instruction button 6102 and a display destination specification area 6103. In this drawing, the state is shown where among the display destination specifications a "B conference room display" 6104 is selected as the display destination and the display is executed by pressing the display button.

Figure 62:
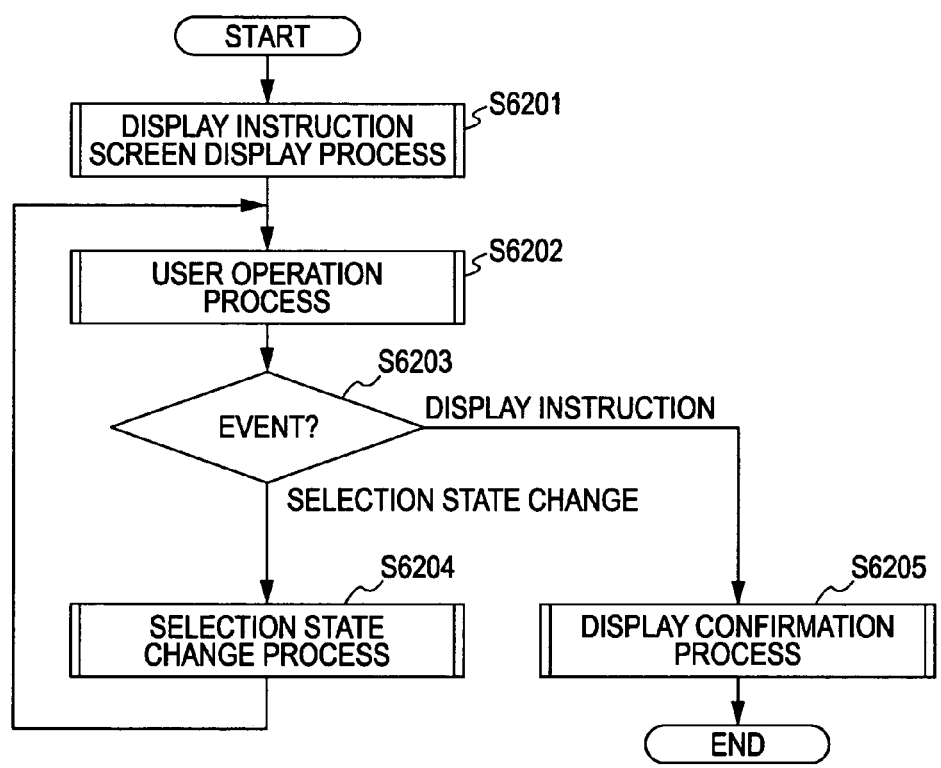
FIG. 62 is a flow diagram showing an exemplary display instruction process.

FIG. 62 is a flow diagram showing an exemplary display instruction process by the display unit 5016 of FIG. 50. The display instruction screen described in FIG. 61 is displayed in a display instruction screen display process in Step S6201, and the processes in Step S6202 and subsequent steps are repeatedly performed. In a user operation process in Step S6202, a user operation is received, and next the flow blanches off in Step S6203. When it is determined in Step S6203 that a selection state change operation has been performed, the selection state is changed in a selection state change operation in Step S6204, and the flow returns to Step S6202 again to repeatedly execute the processes. When it is determined in Step S6203 that a display instruction operation has been performed, the display destinations that have been specified up to now are confirmed in a display confirmation process in Step S6205 to end the process.

Figure 63:
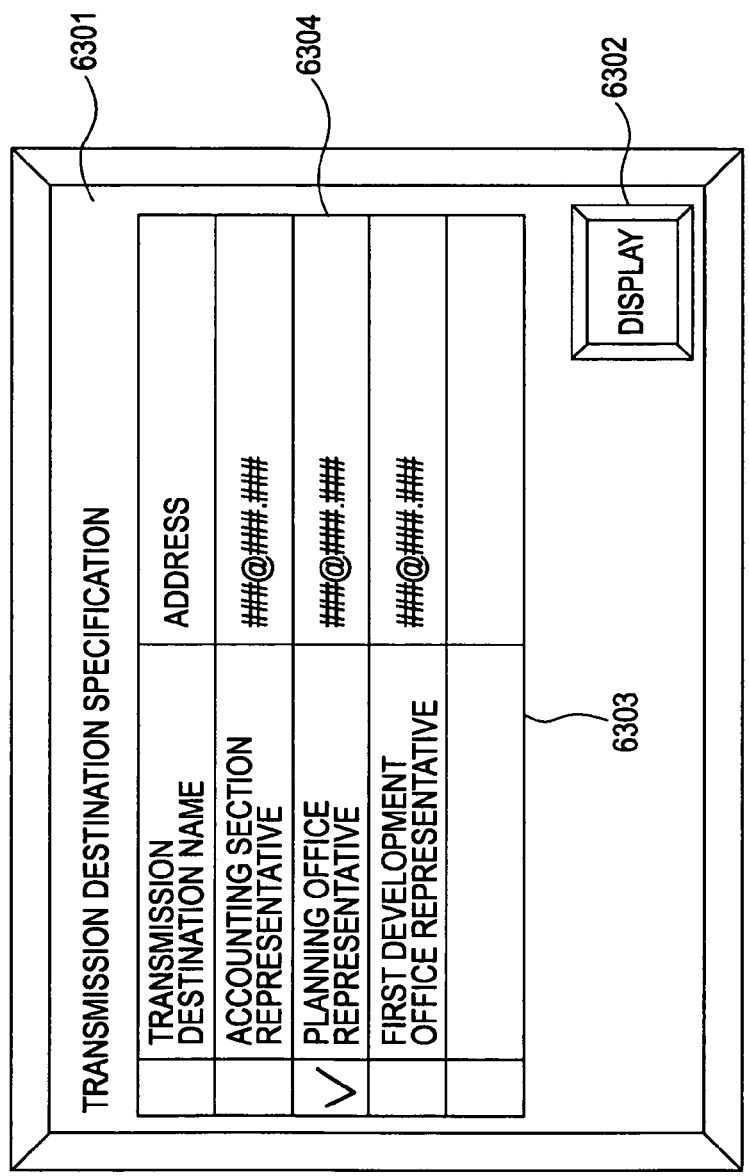
FIG. 63 shows an example of a transmission instruction screen.

FIG. 63 shows an example of a transmission instruction screen displayed on the control panel attached to the scanner according to the eighth embodiment. A transmission instruction screen 6301 is composed of a transmission instruction button 6302 and a transmission destination specification area 6303. In this drawing, the state is shown where among the transmission destination specifications, a "planning office representative" 6304 is selected as the transmission destination, and the transmission is executed by pressing the transmission button.

Figure 64:
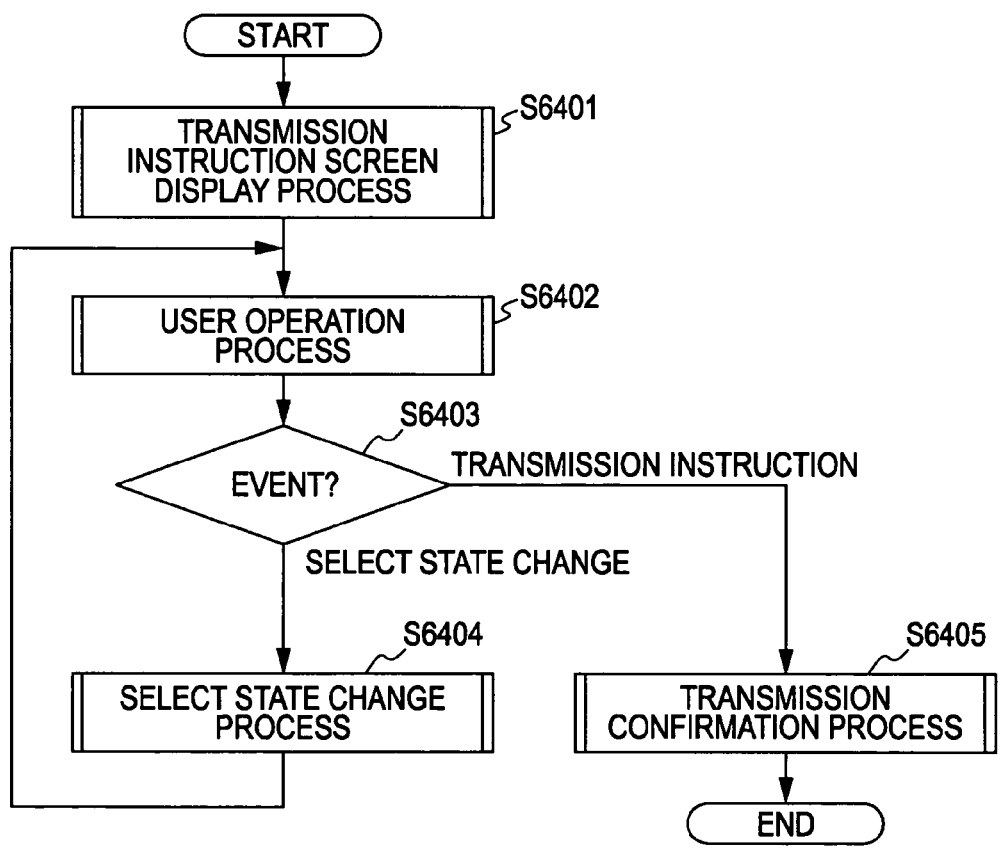
FIG. 64 is a flow diagram showing an exemplary transmission instruction process.

FIG. 64 is a flow diagram showing an exemplary transmission instruction process by the transmission unit 5017 of FIG. 50. A handwriting command display process in Step S6401 displays the transmission instruction screen described in FIG. 63, and the processes in Step S6402 and subsequent processes are repeatedly executed. After that, in a user operation process in Step S6402, a user operation is received, and next the flow blanches off in Step S6403. When it is determined in Step S6403 that a selection state change operation has been performed, the selection state is changed in a selection state change operation in Step S6404, and the flow returns to Step S6402 again to repeatedly execute the processes. When it is determined in Step S6403 that the transmission instruction operation has been performed, the transmission destinations that have been specified up to now are confirmed in a transmission confirmation process in Step S6405 to end the process.

It should be noted that in order to extract the handwriting attribute assignment commands from the scan original, the handwriting attribute assignment commands may be written in different colors or with use of particular ink. As described above, the attribute assignment target can be identified and executed without the range specification, whereby the operability is improved. Also, the weighting can be performed on the attendant attribute, whereby the operability is improved. In addition, the process where the attribute assignment target in the scan original is specified can be instructed, whereby the operability is improved.

It should be noted that the present invention may be applied to a system composed of a plurality of devices (for example, a host computer, an interface device, a reader, a printer, and the like) or an apparatus made of a single device (for example, a copier, a facsimile machine, and the like).

Also, the present invention can be of course realized when a program code stored in a storage medium (or computer readable storage medium) is read out and executed by a computer (alternatively a CPU, or an MPU) of a system or a device. In such a case, a storage medium on which a program code of software for realizing the functions of the above-mentioned embodiments is recorded is supplied to the system or the device. Then, in that case, the program code itself read out from the storage medium realizes the functions of the above-mentioned embodiments. Accordingly, the storage medium storing the program code constitutes the present invention.

As the storage medium for supplying the program code, for example, a floppy disc, a hard disc drive, an optical disc, an opto-magnetic disc, a CD-ROM, a CD-R, a magnetic tape, a nonvolatile memory card, and a ROM may be used.

Moreover, in addition to the case where the functions of the above-mentioned embodiments are realized by executing the program code read out by the computer, for example, the case is of course within the scope of the present invention where an operating system (OS) running on the computer or the like executes a part or all of the actual processes on the basis of the instruction of the program code, and the functions of the above-mentioned embodiments are realized by the executed processes. Furthermore, the program code read out from the storage medium is written in a function expansion board inserted in the computer or a memory provided to a function expansion unit that is connected to the computer is also within the scope of the present invention. The case is as well within the scope of the present invention where a CPU provided to the function expansion board or the function expansion unit executes a part or all of the actual processes on the basis of the instruction of the program code, and the functions of the above-mentioned embodiments are realized by the executed processes. In the case where the present invention is applied to the storage medium, the storage medium stores the program code corresponding to the flowcharts described above.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Application No. 2005-192197 filed Jun. 30, 2005, which is hereby incorporated by reference herein in its entirety.

What is claimed is:

1. An information processing device, comprising:
a processor;
a memory;
a handwriting command interpretation unit configured to interpret handwritten data, input by a handwriting input unit, as a handwriting command;
a search key identification unit configured to identify at least part of the handwritten data as a search key; and
a search unit configured to, when the handwriting command interpretation unit interprets the handwritten data as including a plurality of handwriting search commands and the search key identification unit identifies a plurality of search keys in the handwritten data corresponding to respective input positions of the plurality of handwriting search commands, process the identified plurality of search keys in combination.

2. The information processing device according to claim 1, wherein the search key identification unit identifies a process target from an area obtained on the basis of a size and a position of the corresponding handwriting search command.

3. The information processing device according to claim 1, wherein a display mode of one of the search keys is changed and displayed on a display apparatus so that a user can discriminate the corresponding search key identified by the search key identification unit.

4. The information processing device according to claim 1, further comprising a change unit configured to change a range of a target search key.

5. The information processing device according to claim 1, the search key identification unit including a handwriting character recognition unit configured to recognize stroke data that is displayed on a display device as a character string,
wherein the character string recognized by the handwriting character recognition unit is identified as one of the search keys.

6. The information processing device according to claim 1, wherein the search key identification unit weights each of the plurality of search keys based upon the size of the corresponding handwriting search command.

7. The information processing device according to claim 1, further comprising,
a delete unit configured to delete one or more of the handwriting search commands; and
a search termination unit configured to terminate a search when the corresponding handwriting search command is deleted.

8. The information processing device according to claim 1, further comprising,
a delete unit configured to delete one or more of the handwriting search commands; and
a search key exclusion unit configured to exclude from the combination each of the search keys corresponding to the deleted one or more handwriting search commands.

9. The information processing device according to claim 1, further comprising a search key identification rule specification unit for specifying a rule employed to identify one of the search keys.

10. The information processing device according to claim 1, further comprising a handwriting character recognition unit configured to, when the search key identification unit fails to identify a search key, recognize the handwritten data input by the handwriting input unit as a character string.

11. An information processing control method for an information processing device for processing data that is input by a handwriting input unit, the information processing device including a handwriting command interpretation unit, a search key identification unit, a search unit, a processor and a memory, the method comprising:
utilizing the processor and the memory to perform the following:
via the handwriting command interpretation unit, interpreting handwritten data, input by the handwriting input unit, as a handwriting command;
via the search key identification unit, identifying at least part of the handwritten data as a search key; and
via the search unit, when the handwriting command interpretation unit interprets the handwritten data as including a plurality of handwriting search commands and the search key identification unit identifies a plurality of search keys in the handwritten data corresponding to respective input positions of the plurality of handwriting search commands, processing the identified of search keys in combination.

12. A non-transitory computer readable storage medium containing computer-executable instructions for an information processing device for processing data that is input by a handwriting input unit, the information processing device including a handwriting command interpretation unit, a search key identification unit, a search unit, a processor and a memory, the medium comprising:
computer-executable instructions that interpret, via the handwriting command interpretation unit, handwritten data, input by a handwriting input unit, as a handwriting command;
computer-executable instructions that identify, via the search key identification unit, at least part of the handwritten data as a search key; and computer-executable instructions that identify, via the search unit, when the handwriting command interpretation unit interprets the handwritten data as including a plurality of handwriting search commands and the search key identification unit identifies a plurality of search keys in the handwritten data corresponding to respective input positions of the plurality of handwriting search commands, process the identified plurality of search keys in combination.

* * * * *